(12) United States Patent
Graul

(10) Patent No.: US 11,516,237 B2
(45) Date of Patent: Nov. 29, 2022

(54) VISUALIZATION AND CONTROL OF REMOTELY MONITORED HOSTS

(71) Applicant: CrowdStrike, Inc., Irvine, CA (US)

(72) Inventor: Alexander J. Graul, London (GB)

(73) Assignee: CrowdStrike, Inc., Irvine, CA (US)

( * ) Notice: Subject to any disclaimer, the term of this patent is extended or adjusted under 35 U.S.C. 154(b) by 0 days.

(21) Appl. No.: 16/943,755

(22) Filed: Jul. 30, 2020

(65) Prior Publication Data

US 2021/0037035 A1    Feb. 4, 2021

Related U.S. Application Data

(60) Provisional application No. 62/882,339, filed on Aug. 2, 2019.

(51) Int. Cl.
*H04L 9/40* (2022.01)
*H04L 41/14* (2022.01)
*H04L 41/22* (2022.01)

(52) U.S. Cl.
CPC .......... *H04L 63/1425* (2013.01); *H04L 41/14* (2013.01); *H04L 41/22* (2013.01)

(58) Field of Classification Search
CPC ...... H04L 63/1425; H04L 41/14; H04L 41/22
See application file for complete search history.

(56) References Cited

U.S. PATENT DOCUMENTS

| | | | |
|---|---|---|---|
| 9,158,811 B1 | 10/2015 | Choudhary et al. | |
| 9,407,652 B1 | 8/2016 | Kesin et al. | |
| 9,516,053 B1 | 12/2016 | Muddu et al. | |
| 9,594,904 B1 | 3/2017 | Jain et al. | |
| 10,320,813 B1 | 6/2019 | Ahmed et al. | |
| 10,735,272 B1 | 8/2020 | Saurabh | |

(Continued)

FOREIGN PATENT DOCUMENTS

| | | |
|---|---|---|
| EP | 3206366 | 8/2017 |
| EP | 3528459 | 8/2019 |

OTHER PUBLICATIONS

Extended European Search Report from the European Patent Office for Application No. 20189038.1, dated Dec. 10, 2020, a counterpart foreign application of U.S. Appl. No. 16/943,949, 10 pages.

(Continued)

*Primary Examiner* — Brian Whipple
(74) *Attorney, Agent, or Firm* — Lee & Hayes, P.C.

(57) ABSTRACT

Methods and systems for visualization of data associated with events detected on a monitored server host, and control of the host, are provided. A system may detect an incident on a remote server host. The system may present scores and activity graphs on a user interface for a human operator to review. The user interface may include animated activity graphs to show the progress of a past malicious event. The user interface may emphasize, de-emphasize, and/or hide subgraphs. The user interface may include quick-action buttons and wizards to permit users to immediately kill processes or isolate a computer from the network. The user interface may include controls to bulk-tag detected events associated with a subgraph. The user interface may present notifications/dashboards of significant malicious events in progress and update same when a new event rises in incident score into the top 10.

14 Claims, 6 Drawing Sheets

(56) References Cited

U.S. PATENT DOCUMENTS

| | | |
|---|---|---|
| 10,778,699 B1 | 9/2020 | Bradley et al. |
| 10,992,693 B2 | 4/2021 | Luo et al. |
| 11,102,244 B1 | 8/2021 | Jakobsson et al. |
| 2002/0083343 A1* | 6/2002 | Crosbie ............ G06F 21/552 726/23 |
| 2007/0209074 A1* | 9/2007 | Coffman ............ H04L 63/145 726/23 |
| 2012/0137367 A1 | 5/2012 | Dupont et al. |
| 2013/0021382 A1 | 1/2013 | Morlock et al. |
| 2015/0242637 A1 | 8/2015 | Tonn et al. |
| 2015/0334132 A1* | 11/2015 | Zombik ............ H04L 41/28 726/1 |
| 2016/0226904 A1 | 8/2016 | Bartos et al. |
| 2016/0344762 A1 | 11/2016 | Jou et al. |
| 2017/0093900 A1* | 3/2017 | Nomura ............ H04L 63/1425 |
| 2017/0171389 A1 | 6/2017 | Lopez et al. |
| 2017/0230392 A1 | 8/2017 | Dean et al. |
| 2017/0288979 A1 | 10/2017 | Yoshihira et al. |
| 2018/0159876 A1 | 6/2018 | Park et al. |
| 2018/0167402 A1 | 6/2018 | Scheidler et al. |
| 2018/0227322 A1 | 8/2018 | Luo et al. |
| 2018/0288060 A1 | 10/2018 | Jackson et al. |
| 2018/0316704 A1 | 11/2018 | Joseph Durairaj et al. |
| 2018/0367548 A1 | 12/2018 | Stokes, III et al. |
| 2019/0068627 A1* | 2/2019 | Thampy ............ H04L 63/1416 |
| 2019/0207969 A1 | 7/2019 | Brown |
| 2019/0362074 A1 | 11/2019 | Wang et al. |
| 2020/0076853 A1 | 3/2020 | Pandian et al. |
| 2020/0128047 A1 | 4/2020 | Biswas et al. |
| 2020/0159380 A1* | 5/2020 | Wadikar ............ H04L 41/22 |
| 2020/0366699 A1 | 11/2020 | Sampaio et al. |
| 2020/0410403 A1 | 12/2020 | Kamulete |

OTHER PUBLICATIONS

Extended European Search Report from the European Patent Office for U.S. Appl. No. 16/943,755, dated Dec. 14, 2020, a counterpart foreign application of U.S. Appl. No. 16/943,755, 8 pages.

Extended European Search Report from the European Patent Office for U.S. Appl. No. 16/944,052, dated Dec. 18, 2020, a counterpart foreign application of U.S. Appl. No. 16/944,052, 9 pages.

Extended European Search Report from the European Patent Office for Application No. 20189028.2, dated Dec. 8, 2020, a counterpart foreign application of U.S. Appl. No. 16/944,033, 11 pages.

Kang et al, "Parameter and quantile estimation for the generalized Pareto distribution in peaks over threshold framework", Journal of Korean Statistical Society, vol. 46, No. 4, Mar. 18, 2017, pp. 487-501.

Office Action for U.S. Appl. No. 16/943,949, dated Jun. 22, 2022, Brown, Malicious Incident Msualization, 23 pages.

Office Action for U.S. Appl. No. 16/944,052, dated Mar. 30, 2022, Brown, "Advanced Incident Scoring", 16 pages.

Office Action for U.S. Appl. No. 16/944,033, dated Aug. 26, 2022, Brown, "Mapping Unbounded Incident Scores To a Fixed Range", 19 Pages.

* cited by examiner

VISUALIZATION AND CONTROL OF REMOTELY MONITORED HOSTS

CROSS-REFERENCE TO RELATED APPLICATION

This application claims priority to U.S. Patent Application No. 62/882,339, entitled "Advance Incident Scoring and User Interface," filed Aug. 2, 2019, which is expressly incorporated herein by reference in its entirety.

BACKGROUND

In computer security, the deployment of network-connected frontends, backends, middleware, databases, applications, interfaces, web services, and the like is based on server hosts supported by underlying infrastructure such as cloud computing systems, data centers, and other such networked computing systems. Administrators of deployed network services and security analysts have responsibility for maintaining availability of server hosts, and taking appropriate responsive actions in the event of incidents such as power failures, hardware failures, network failures, malicious attacks, and the like.

As administrators and analysts must take actions in a timely fashion in response to incidents in real time, performance of their duties may be facilitated by monitoring tools running on computing systems configured for human interaction. Monitoring tools may allow administrators and analysts to monitor information and statuses of server hosts over a network, and exercise human judgment to identify symptoms indicating the occurrence of incidents that require response. This may be a difficult task, as incidents on hosts may progress in a time-critical manner, challenging human operators to quickly review and summarize large amounts of information which may require extensive interaction to navigate, and reach conclusions in an expeditious manner.

Furthermore, human operators may be challenged to operate monitoring tools running on computing systems to remotely impose control upon monitored hosts and enact responsive actions that may resolve, curtail, mitigate, quarantine, or otherwise address incidents occurring at one or more hosts. Effective monitoring and control by network administrators and security analysts generally depend on experience with navigating and operating of particular monitoring tools, and costs of acquiring, training, and retaining such experience tend to be high.

Thus, there is a need to lower human capital costs of acquiring experience in remote monitoring and control of server hosts.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods discussed herein are directed to implementing visualization and control of remotely monitored server hosts, and more specifically generating and presenting multiple interactive visual representations of event data of server hosts over a network and translating interactions upon a visual representation to commands executable by one or more remotely monitored server hosts.

Figure 1:
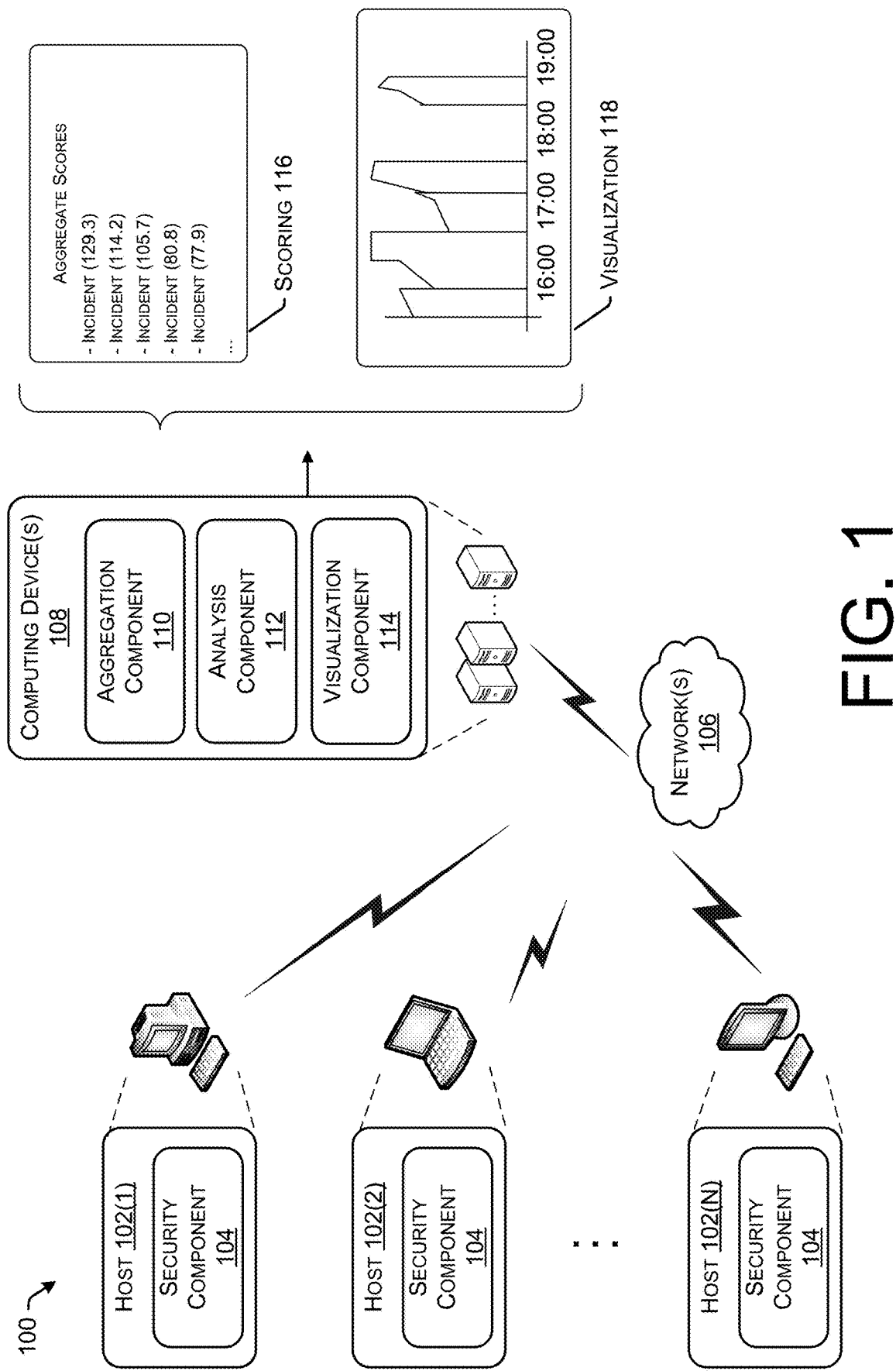
FIG. 1 illustrates a schematic diagram of a network configuration wherein a security system is in communication with a plurality of monitored hosts.

FIG. 1 illustrates a schematic diagram of a network configuration wherein a security system is in communication with a plurality of monitored hosts. The network configuration may include a networked system 100 which includes hosts 102(1)-102(N) (individually and/or collectively referred to herein with reference 102), where N is any integer greater than or equal to 2.

Each host 102 may be any physical or virtual networked computing device or computing system operative to operate as a networked server, which may host, individually or collectively, frontends, backends, middleware, databases, applications, interfaces, web services, and the like configured to be accessible to other computing devices and/or computing systems over one or more networks. Any number of hosts 102 may be or may include any suitable type of networked physical computing device or computing system, including, without limitation, any number of dedicated hardware servers, mainframes, workstations, personal computers ("PCs"), laptop computers, tablet computers, personal digital assistants ("PDAs"), cellular phones, media centers, smart appliances, embedded systems, and the like, and may be or may include any suitable type of networked virtual computing device or computing system, such as any number of virtual machines ("VMs") or virtual servers.

Each host 102 may implement a security component 104, which may include computer-executable instructions stored in a computer-readable storage medium of the respective host 102 and executable by one or more processor(s) of the respective host 102 loading the computer-executable instructions into one or more memories of the respective host 102. Implementation of the security component 104 shall be described in further detail subsequently.

A networked system 100 may be established over one or more computer networks and configured to interconnect communication between the hosts 102 and computing resources thereof, such as physical and/or virtual processors, memory, storage, computer-executable applications, computer-readable data, and the like. The one or more computer networks may include wired networks, wireless networks, and combinations of wired and wireless networks.

Hosts 102 of a networked system 100 may receive inbound traffic from external hosts over network(s) 106, such as personal area networks ("PANs"), wired and wireless local area networks ("LANs"), wired and wireless wide area networks ("WANs"), the Internet, and so forth, through junctions such as gateways, firewalls, and the like. Inbound traffic may take the form of data packets formatted and encapsulated according to any combination of a variety of network communication protocols which may interoperate, such as Internet Protocol ("IP") and Transmission Control Protocol ("TCP"), and the like.

Hosts 102 of the networked system 100 may be servers which provide computing resources for hosted frontends, backends, middleware, databases, applications, interfaces, web services, and the like. These computing resources may include, for example, computer-executable applications, databases, platforms, services, virtual machines, and the like. While any of these hosted elements are running and available over one or more network(s) 106, one or more respective host(s) 102 where the element is hosted may be described as undergoing uptime. While these hosted elements are not running and/or not available over one or more network(s) 106, one or more respective host(s) 102 where the element is hosted may be described as undergoing downtime.

The overall architecture of the networked system 100 may be logically organized according to various network architectures and topologies as known to persons skilled in the art.

For example, hosts 102 may be organized into local area networks ("LANs"), in which case hosts 102 of a LAN may be interconnected by network topologies such as bus, ring, star, mesh, tree topologies and the like as known to persons skilled in the art.

For example, hosts 102 may be organized into physical and/or virtual clusters, where physical and/or virtual computing resources of hosts 102 of each physical and/or virtual cluster may perform one or more common function(s). In cases where hosts 102 are organized into clusters, data packets destined to one or more hosts 102 of a cluster may be passed from junctions to a switch fabric of the networked system 100. A switch fabric generally refers to a component of a network architecture wherein a collection of some number of network switches interconnected by network connections. Any number of hosts 102 of a same cluster of the networked system 100 may connect to switches of a same switch fabric. Switches of the switch fabric may serve to forward data packets between the hosts 102 of the cluster so as to interconnect traffic between the hosts 102 without those hosts 102 being directly interconnected.

For example, hosts 102 may be organized as one or more physical and/or virtual data centers, wherein physical and/or virtual computing resources of hosts 102 of each physical and/or virtual data center may be allocated and scaled according to needs of computing tasks of data center customers. In cases where hosts 102 are organized into data centers, a networked system 100 implementing a data center may have a three-tier architecture (composed of network switches organized into access, aggregate, and core layers), or other architectures as known to persons skilled in the art.

Hosts 102 may alternatively be organized in any other network architecture suitable for hosting frontends, backends, middleware, databases, applications, interfaces, web services, and the like as known to persons skilled in the art.

Example embodiments of the present disclosure provide one or more computing system(s) 108, which may be one or more physical and/or virtual computing systems configured physically and/or virtually outside of the networked system 100. Examples of implementations of one or more computing system(s) 108 shall be described in further detail subsequently with reference to FIG. 2. Each of the hosts 102, or physical or logical organizations of hosts 102 such as clusters and/or data centers and the like, may be configured in communication with the computing system(s) 108 over network(s) 106.

According to example embodiments of the present disclosure, the security component 104 may include one or more kernel-level security agents. Kernel-level security agents may include computer-executable instructions configured to be executed by one or more processor(s) of a host 102 by loading at least part of the computer-executable instructions into kernel space of one or more memories of the respective host 102, wherein calls to low-level services provided by an operating system ("OS") running on the respective host 102 may be executed.

Components of kernel-level security agents may include activity pattern consumers configured to be executable by one or more processor(s) of a host 102 at least in part in kernel space to receive notifications of activity patterns associated with execution activity patterns of the host 102; filters configured to be executable by one or more processor(s) of a host 102 at least in part in kernel space to exclude some activity patterns of the host 102; an activity pattern bus configured to be executable by one or more processor(s) of a host 102 at least in part in kernel space to route activity patterns to other agent module(s); correlators configured to be executable by one or more processor(s) of a host 102 at least in part in kernel space to track types of activity patterns of the host 102; actors configured to be executable by one or more processor(s) of a host 102 at least in part in kernel space to gather state information and act upon activity patterns of the host 102; and a situational model configured to be executable by one or more processor(s) of a host 102 at least in part in kernel space to model typical activity patterns of the host 102 and compare observed activity patterns with typical activity patterns.

Software packages encompassing computer-executable instructions implementing kernel-level security agents of a security component 104 may be installed by and configured by one or more computing system(s) 108 by the computing system(s) 108 sending to hosts 102, and hosts 102 receiving, installing, configuring, patching, and updating software packages in one or more computer-readable storage media and in kernel space memory of the respective hosts 102. Upon installation and configuration, the kernel-level security agents may each output activity patterns by operation of components as described above, as well as incident scores based on the activity patterns as determined by components of kernel-level security agents. During uptime of a host 102, components of kernel-level security agents may execute at least in part in kernel space; monitor activity patterns of the host 102; generate activity patterns and determine incident scores of the host 102; and send monitoring information, which may include, for example, the observed activity patterns and determined incident scores, to the computing system(s) 108 on an ongoing basis.

According to example embodiments of the present disclosure, components of kernel-level security agents may be executed by one or more processor(s) of a host 102 to configure the host to open, continuously or at intervals, a secured connection over one or more network(s) 106 to the computing system(s) 108. The secured connection may be by a protocol which implements private, inter-network communications over public network protocols, such as a tunneled connection by private network protocols such as virtual private network ("VPN"); virtualized network communication protocols such as Virtual LAN ("VLAN") or Virtual Extensible LAN ("VxLAN"); routing protocols such as Multiprotocol Label Switching ("MPLS"); and the like. Over the secured connection, hosts 102 may provide monitoring information such as activity patterns and incident scores to the computing system(s) 108. Over the secured connection, the hosts 102 may receive software packages, package updates, configurations, configuration updates, remote commands, and the like, from the computing system(s) 108.

Hosts 102 may receive one or more software package(s) implementing the security component 104 by various download protocols over secured connection(s) to the computing system(s) 108, then install the software package(s) locally and configure the installed software package(s) to be executed on each respective host 102. Components of kernel-level security agents as described above may receive notifications of activity patterns on hosts 102 having semantic interest to human operators such as network administrators and security analysts (such as file writes on hosts 102, executables files being launched on hosts 102, or flow of network traffic between multiple hosts 102) from host operating system hooks or filter drivers, from user-mode activity pattern monitors, or from threads monitoring log files or memory locations. Thus, the security component 104 may observe activity patterns of a host 102, may determine incident scores based on those activity patterns, and may send monitoring information, such as observed activity patterns, to the computing system(s) 108 through a secured connection over one or more network(s) 106.

Observed activity patterns may be further processed by components of kernel-level security agents before transfer through the secured connection to the computing system(s) 108. For example, according to example embodiments of the present disclosure, filters of the kernel-level security agents, which may be configurable, may exclude known safe activity patterns from the observed activity patterns, causing size of data transferred over the secured connection to be reduced. It should be understood that such action by filters is not mandatory, and according to some example embodiments of the present disclosure the observed activity patterns may be transferred through the secured connection without filtering.

Components of kernel-level security agents running on a host 102 may enact network containment actions at the host 102 based on commands received over the secured connection from the computing system(s) 108. A human operator such as a network administrator or security analyst may, as shall be described subsequently, review monitoring information received from one or more hosts 102 by operating the computing system(s) 108, and may determine therefrom that containment actions should be enacted at one or more hosts 102. For example, without limitation, the human operator may determine, based on an aggregated incident score of a particular host being over a particular threshold, that the particular host has been compromised by a security incident, while other hosts have not been compromised by any security incidents. The human operator may then operate the computing system(s) 108 to cause the computing system(s) 108 to send one or more commands over the secured connection to the one or more hosts 102 to enact network containment actions.

Upon one or more hosts 102 receiving one or more commands over the secure connection, a security component 104 of a respective host 102 may cause the respective host 102 to enact a network containment action. For example, without limitation, a network containment action may include a particular host network-segmenting itself apart from other hosts. In this regard, network connections between the particular host and other hosts may become blocked or closed; or, the particular host may become configured to perform network communications only on a virtual network which does not include any other hosts.

For example, a host 102 may become network-segmented apart from other hosts by a security component 104 running on the host configuring segmentation rules in a firewall policy on the host 102.

According to example embodiments of the present disclosure, upon the security component 104 configuring segmentation rules in the firewall policy, a firewall running on the host 102 may enforce the segmentation rules of the firewall policy by denying outgoing data packets over each communication interface of the host 102 (e.g., ports), and incoming data packets over each communication interface of the host 102, including data packets that would have been allowed prior to the configuration of segmentation rules in the firewall policy.

According to example embodiments of the present disclosure, upon the security component 104 configuring segmentation rules in the firewall policy, a firewall running on the host 102 may enforce segmentation rules of the firewall policy by denying all traffic to each communication interface of the host 102 from sources having remote network addresses (for example, IP addresses) that are not otherwise specified in the firewall policy as an exception for allowed traffic, and denying all traffic from each communication interface of the host to destinations having remote network addresses that are not otherwise specified in the firewall policy as an exception for allowed traffic.

According to example embodiments of the present disclosure, segmentation rules may be selective segmentation rules, such that, upon the security component 104 configuring selective segmentation rules in the firewall policy, a firewall running on the host 102 may enforce selective segmentation rules of the firewall policy by denying some outbound and/or inbound traffic over network(s) 106 at the host 102, without denying all outbound and/or inbound traffic. For example, selective segmentation rules of the firewall policy may specify, in addition to denying policies such as those described above, exceptions, which may take effect at the same time as denying policies such as those described above take effect, for remote network addresses from which inbound data packets may be received by the host 102 and/or to which outbound data packets may be sent by the host 102.

By configuring selective segmentation rules in a firewall policy, a human operator such as a network administrator or security analyst may maintain an open connection, such as a secured connection as described above, between the computing system(s) 108 and the host 102, so that the human operator may continue to monitor and exercise control over the network-segmented host 102 while it has been safely segmented from all other hosts of a networked system 100. To accomplish this result, a selective segmentation rule of a firewall policy as described above may specify an exception for at least one remote network address assigned to the computing system(s) 108 on at least one network of the one or more network(s) 106. The exception may further specify an action to allow outgoing data packets to, and incoming data packets from, the computing system(s) 108 as identified by any suitable network identifier, which may be associated with the at least one remote network address specified in the exception.

Alternatively, according to example embodiments of the present disclosure, a host 102 may become network-segmented apart from other hosts by a security component 104 running on the host configuring access control list ("ACL") rules on the host 102 to exclude other hosts of the networked system 100. Furthermore, the security component 104 may configure ACL rules so as to exclude the computing system(s) 108 from segmentation from the host 102.

Alternatively, according to example embodiments of the present disclosure, a host 102 may become network-segmented apart from other hosts by a security component 104 running on the host configuring a VLAN or a subnet which includes the host 102 but does not include any other hosts of the networked system 100. Furthermore, the security component 104 may configure the VLAN or the subnet so as to include the computing system(s) 108 within the VLAN or subnet, virtualizing a network connection between the computing system(s) 108 and the host 102 despite the computing system(s) 108 not being part of the networked system 100.

Alternatively, according to example embodiments of the present disclosure, a host 102 may become network-segmented apart from other hosts by a security component 104 running on the host configuring a software-defined network ("SDN") which includes the host 102 but does not include any other hosts of the networked system 100. Furthermore, the security component 104 may configure the SDN so as to include the computing system(s) 108 within the SDN, virtualizing a network connection between the computing system(s) 108 and the host 102 despite the computing system(s) 108 not being part of the networked system 100.

According to example embodiments of the present disclosure, a network containment action may include a particular host blocking outbound traffic to and/or inbound traffic from other hosts which matches an activity pattern of interest at least in part. The activity pattern of interest may be one of a number of activity patterns observed by a security component 104 and sent to the computing system(s) 108 as part of monitoring information, and may be identifiable by the computing system(s) 108 or by a human operator of the computing system(s) 108 as being of security interest. Such containment actions may be appropriate in the event that the activity pattern of interest does not affect all outbound and/or inbound traffic at the particular host outside of certain activity patterns. In this regard, network connections between the particular host and other hosts may remain open, without network-segmenting the particular host apart from other hosts.

According to example embodiments of the present disclosure, the computing system(s) 108 includes an aggregation component 110, an analysis component 112, and a visualization component 114.

The aggregation component 110 may be operative to, based on observed activity patterns received from kernel-level security agents of a host 102, aggregate a series of events over host uptime from the observed activity patterns. A plurality of aggregated events over host uptime may summarize the observed activity patterns as a time series of data, each event being a data entry which aggregates activity patterns over a discrete period of host uptime which may follow some number of preceding events and which may precede some number of subsequent events. Events aggregated in this manner may be equal in host uptime duration or may not be equal in host uptime duration; for example, an event may encompass a longer host uptime period in the event that activity patterns are low in activity over that period, and an event may encompass a shorter host uptime period in the event that observed activity patterns are high in activity over that period. In this manner, activity pattern information having less security interest may be condensed, and activity pattern information having greater security interest may be highlighted.

Additionally, the aggregation component 110 may gather enrichment data from various sources as context to aggregate observed activity patterns as events. For example, enrichment data may include information regarding startup, shutdown, and restart times of a host 102. Based thereon, the aggregation component 110 may aggregate events separately based on observed activity patterns following a startup, observed activity patterns following a restart, observed activity patterns preceding a restart, observed activity patterns preceding a shutdown, and the like. For example, enrichment data may include information regarding communication with other hosts at particular times. Based thereon, the aggregation component 110 may aggregate events separately based on observed activity patterns preceding communication with a particular other host, observed activity patterns following communication with a particular other host, and the like.

The analysis component 112 may determine that a host 102 is potentially compromised. Determining that a host 102 is potentially compromised may include determining that observed activity patterns of the host 102 are associated with malicious code or indicators of attack. According to example embodiments of the present disclosure, the analysis component 112 may analyze the observed activity patterns including inter-host activities, such as communications, to determine if the connected hosts 102 are potentially compromised.

The analysis component 112 may detect trends from events summarized in the plurality of events. Trends may be detected based on any one or more predetermined criteria to identify detected events that indicates that one or more events of the plurality of events may indicate suspicious and/or potentially malicious activity was occurring over a period of host uptime encompassed by the one or more events. The one or more predetermined criteria may include, but is not limited to, a predetermined number of repeated sequence(s) of events, any processes performed by detection module 206 and analysis component 112 to determine trends of detected events, trends of known malicious activity, and trends of statistical significance including incident scores graph and graph of mapping score to range as shall be described subsequently.

According to example embodiments of the present disclosure, several aggregated events and/or detected trends occurring together may imply a jointly higher statistical significance than each occurring separately. For example, trends may represent a single aggregated event or any repeated sequence of events that indicates malicious behavior. The analysis component 112 may detect at least some of the plurality of events including any read and write operations, and other operations, as a trend. For example, detected trends may include execution of code exceeding a frequency threshold; reads and/or writes to particular memory addresses; communications from one host to another exceed over a frequency threshold and/or match a particular size; and the like.

According to example embodiments of the present disclosure, the aggregation component 110 and the analysis component 112 may detect trends based on one or more predetermined criteria and may aggregate the detected trends by trend types using trend identifiers. In some examples, the trends aggregated by identifiers and/or types may identify trends that are distinct or similar. In additional examples, the analysis component 112 may determine a total trend count for the total number of non-distinct trends detected in the plurality of events, determine a trend specific count for each trend aggregated by trend type, and determine a trend score for each trend. In additional examples, the analysis component 112 may determine the trend score for each trend using different host uptime intervals (e.g., 30 minutes, 1 hours, 24 hours, 1 week, 1 month, etc.) and store the scores as historical data for the different host uptime intervals.

According to example embodiments of the present disclosure, the analysis component 112 may determine trend scores based on quantifying statistically significant information in the trends detected from events of the plurality of events. The analysis component 112 may determine a trend distribution of the frequency of each trend, in which the trend frequencies are sorted from highest frequency to lowest frequency. For example, trends may be scored over individual hosts, across a networked system, across a geographic area, and the like. The analysis component 112 may score trends based on frequency distributions, which may be correlated with statistical significance of information conveyed by the occurrence of the trends. For instance, trends that occur frequently may correlate with information having lower security interest, while conversely trends that occur infrequently may correlate with information having higher security interest. In various examples, the base trend score for an associated trend type may be inversely correlated with its frequency. For instance, a first trend that occurs frequently may have a low trend score, while a second trend that occurs infrequently may have a high trend score.

According to example embodiments of the present disclosure, the analysis component 112 may determine trend scores based on one or more information quantifying models. As a nonlimiting example, the trend scores may be determined as "surprisal values" based on information theory and may assume using base-2 logs, and the result is a measure of information content of trend presence in bits. That is: log 2(1/P(dt)) or more simply −log 2(P), where P(dt) is the probability that a randomly selected detection d is of type t. The detection d being of type t in this system is analogous to the Pi term in the surprisal equation formulated as: I(E):=−log[Pr(E)]=−log(P).

Additionally, and/or alternatively, assuming events E are independent, the events E can be summed in log space which is homomorphic with multiplying them in scalar space. Accordingly, the surprisal values can be aggregated as: −i log(Pi). In some examples, the analysis component 112 can determine that some detected trends ("detects") have some probable relationship, for example occurring clustered during a predetermined host uptime interval on a particular host, thus the trend scores as determined by surprisal values can be summed to quantify the amount of information conveyed by the combination of detects. The analysis component 112 may determine an "incident" from this combination of detects and the sum of the surprisal values may be an "incident score."

According to further example embodiments of the present disclosure, the base trend score may be adjusted by a weight based on additional information. For example, analysis component 112 may consult a trend catalog to determine whether the trend matches a known-good or known-bad trend. Trend score weight may be upweighted in accordance with matching a known-bad trend, and trend score weight may be downweighted in accordance with matching a known-good trend. Furthermore, if the security system detects a similar trend on multiple hosts at a similar host uptime interval, the weight of the trend score for that trend may increase.

According to example embodiments of the present disclosure, the analysis component 112 may determine an incident score based on a sum of trend scores for trends detected in the plurality of events. The analysis component 112 may repeat determining the incident score by repeating the summation of trend scores during multiple instances of a predetermined time interval. For instance, if the predetermined time interval is one hour, then at 7 o'clock, the incident score may be a summation of all trend scores over host uptimes from 6:00-7:00. The incident score may or may not indicate that an incident is occurring. For instance, while the incident score is below a threshold score, the analysis component 112 may conclude that an incident is not ongoing, but upon the incident score reaching or exceeding a threshold score, the analysis component 112 may conclude that an incident is ongoing.

The analysis component 112 may determine an incident score associated with events over a host uptime interval based on one or more scoring schemes, including, but not limited to: aggregating trend scores associated with all detected trends comprising the incident; or the maximum observed incident score during the incident's timespan. In various examples, the incident score can include total counts or percentages of all trend types.

According to example embodiments of the present disclosure, the analysis component 112 may determine that at least some events of the plurality of events represent an incident indicating malicious behavior, based on one or more incident scores of those events. For example, the determination may be based on one or more of: comparing incident scores to historical incident scores (e.g., compared to score from a week, a month, or a year ago, etc.), comparing the incident score to a predetermined threshold score, or ranking the incident scores and selecting a predetermined number of top incident scores to present to an analyst for further review.

The analysis component 112 may create an incident, where an incident may be represented by a data record including a start time and an end time for an incident timespan. A newly created incident may be in an open state from a start time onward while one or more incident scores of ongoing events reach or exceed a predetermined score threshold (which shall subsequently be referred to as a "positive incident score"), and the incident timespan may increase while the incident is in an open state. Upon one or more incident scores of ongoing events falling below the incident score falls below the predetermined score threshold (which shall subsequently be referred to as a "negative incident score"), an end time of the incident may be demarcated and the incident set to a closed state so that the incident timespan no longer increases. During an intervening time while the incident is in an open state, the analysis component 112 may update a data record representing an incident to include newly detected trends and changed incident scores.

According to example embodiments of the present disclosure, a human operator may operate the computing system(s) 108 to enact remediation actions with respect to one or more hosts 102 wherein incident scores of past or ongoing events are positive. For example, the human operator may operate the computing system(s) 108 to cause commands to be sent to those one or more hosts 102 over a secured connection as described above, the commands being executable by the one or more hosts 102 to enact remote reboots or remote shutdowns at the one or more hosts, enact network containment as described above at the one or more hosts 102, terminate running code such as applications or threads at the one or more hosts 102, or cause various other operations suitable to secure those hosts 102 against damaging effects of incidents identified from past or ongoing events.

A visualization component 114 may generate various user interfaces, views, graphics, visualizations, notifications, controls, and the like displayable on one or more output devices of the computing system(s) 108, so that a human operator may operate the computing system(s) 108 to view and interact with user interfaces and controls; inspect views, graphics, visualizations and/or notifications based on events aggregated over host uptime and incidents detected among those events; inspect views, graphics, visualizations and/or notifications of hosts, events, and incidents; identify one or more hosts 102 that have been compromised based on viewed information; and to send commands to one or more hosts 102 identified according to appropriate responses to incidents.

According to an example embodiment of the present disclosure, the visualization component 114 may generate a ranked incident scoring 116 and generate a visualization 118 thereof. The scoring 116 may present a predetermined number of incidents having highest incident scores (e.g., top 10 or top 5) occurring within a predetermined time period (e.g., within 24 hours). The visualization 118 may present a time series graph representing the scoring 116 to provide visual aid to permit a human operator to view incidents most likely indicating malicious behavior. The example time series graph may present additional information, including time interval of each incident and trends having high trend scores. The system may further aggregate scores to provide succinct summarization of overall health of hosts 102 of a networked system 100, by analyzing a small number of top scores to produce a confidence estimate of whether there is a multi-prong threat. This confidence estimate may provide a risk assessment that new high scoring incidents can be expected in the near future. The visualization 118 may be presented as a primary view in a user interface, alongside secondary notifications of a visualization for the group of activity trends and the aggregated scores with the risk assessment results.

Figure 2:
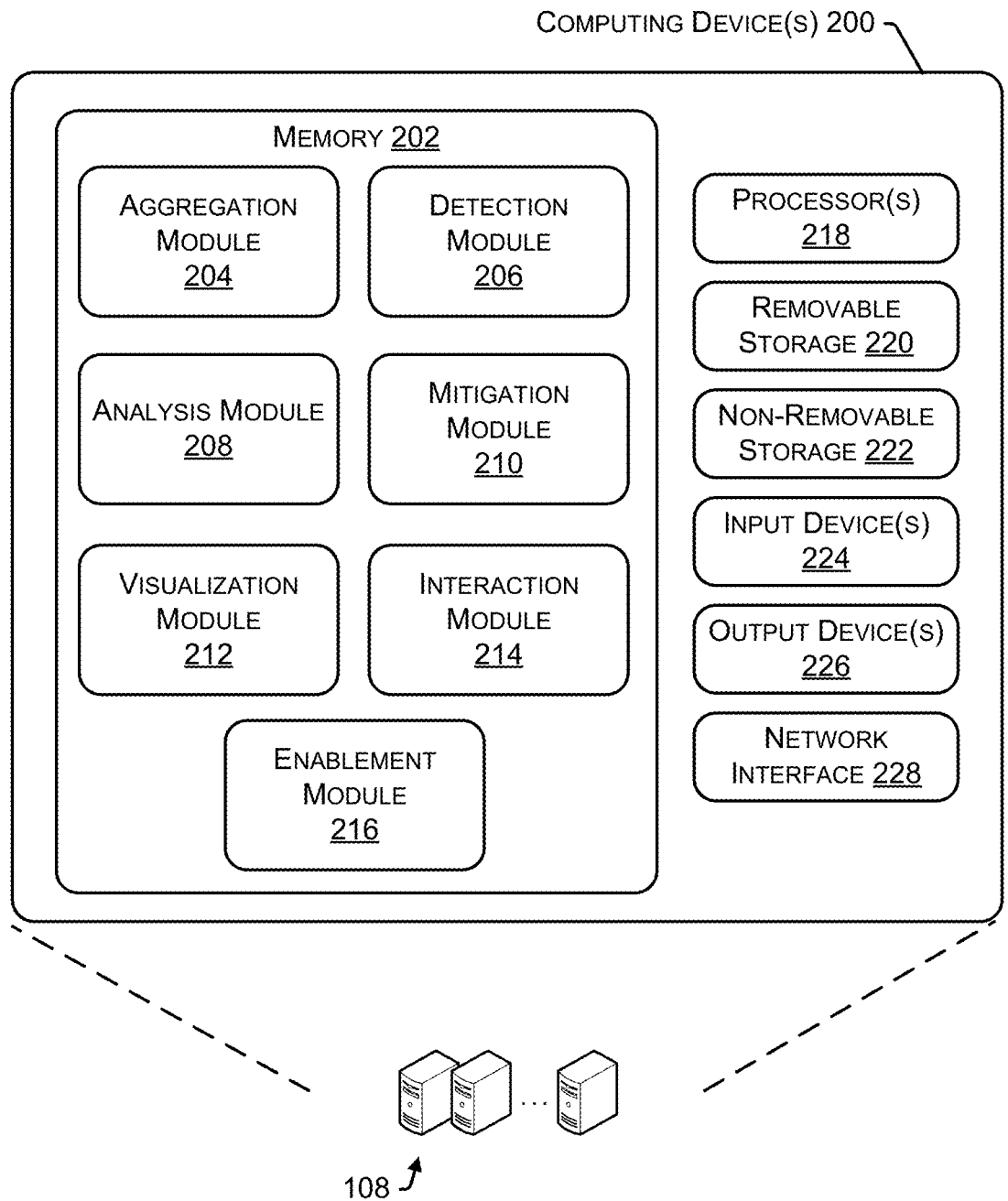
FIG. 2 illustrates a block diagram of one or more computing system(s) according to example embodiments of the present disclosure.

FIG. 2 illustrates a block diagram of one or more computing system(s) 200 according to example embodiments of the present disclosure. One or more computing system(s) 200 according to example embodiments of the present disclosure may correspond to one or more computing system(s) 108 of FIG. 1 above.

The techniques and mechanisms described herein may be implemented by multiple instances of the computing system(s) 200, as well as by any other computing device, system, and/or environment. The computing system(s) 200 may be one or more distributed system composed of multiple physically networked computers or web servers, a physical or virtual cluster, a computing cloud, or other networked computing architectures providing physical or virtual computing resources as known by persons skilled in the art. The computing system(s) 200 shown in FIG. 2 encompass only one example of one or more system(s) and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like. By way of example, and without limitation, the computing system(s) 200 can be implemented as various computing systems 200(1), 200(2), . . . , 200(N).

As illustrated, the computing system(s) 200 comprises a memory 202 storing an aggregation module 204, a detection module 206, an analysis module 208, a mitigation module 210, a visualization module 212, an interaction module 214, and an enablement module 216. Also, the computing system(s) 200 includes processor(s) 218, a removable storage 220 and non-removable storage 222, input device(s) 224, output device(s) 226, and network interface 228.

The memory 202 may be communicatively coupled to the processor(s) 218. The processor(s) 218 and memory 202 may be physical or may be virtualized and/or distributed. In embodiments, the processor(s) 218 may include one or more general-purpose processor(s) and one or more special-purpose processor(s). The general-purpose processor(s) and special-purpose processor(s) may be physical or may be virtualized and/or distributed. The general-purpose processor(s) and special-purpose processor(s) may execute one or more instructions stored on a computer-readable storage medium as described below to cause the general-purpose processor(s) or special-purpose processor(s) to perform a variety of functions. General-purpose processor(s) may be computing devices operative to execute computer-executable instructions, such as Central Processing Units ("CPUs"). Special-purpose processor(s) may be computing devices having hardware or software elements facilitating computation of machine learning computing tasks such as training and inference computations. For example, special-purpose processor(s) may be accelerator(s), such as Neural Network Processing Units ("NPUs"), Graphics Processing Units ("GPUs"), Tensor Processing Units ("TPU"), implementations using FPGAs and ASICs, and/or the like. To facilitate computation of machine learning tasks, special-purpose processor(s) may, for example, implement engines operative to compute mathematical operations such as matrix operations and vector operations. Additionally, each of the processor(s) 218 may possess its own local memory, which also may store program modules, program data, and/or one or more operating systems.

Depending on the exact configuration and type of the computing system(s) 200, the memory 202 may be volatile, such as RAM, non-volatile, such as ROM, flash memory, miniature hard drive, memory card, and the like, or some combination thereof. The memory 202 may include one or more computer-executable modules as described above and in further detail subsequently that are executable by the processor(s) 218. The modules may be hosted on a network as services for a data processing platform, which may be implemented on a separate system from the computing system(s) 200.

An aggregation module 204, a detection module 206, an analysis module 208, a mitigation module 210, a visualization module 212, an interaction module 214, and an enablement module 216 stored in the memory 202 can comprise methods, threads, processes, applications or any other sort of executable instructions. An aggregation module 204, a detection module 206, an analysis module 208, a mitigation module 210, a visualization module 212, an interaction module 214, and an enablement module 216 may also include files and databases.

According to example embodiments pf the present disclosure, the computer-readable memory 202 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). The computer-readable memory 202 may also be described as computer storage media or non-transitory computer-readable media, and may include volatile and nonvolatile, removable and non-removable media implemented in any method or technology for storage of information, such as computer readable instructions, data structures, program modules, or other data. Computer-readable storage media (or non-transitory computer-readable media) include, but are not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, and the like, which can be used to store the desired information and which can be accessed by the computing system(s) 200. Any such memory 202 may be part of the computing system(s) 200.

According to example embodiments of the present disclosure, the aggregation module 204 may configure the computing system(s) 200 to, based on observed activity patterns received from kernel-level security agents of a host, aggregate a series of events over host uptime from the observed activity patterns. Additionally, an aggregation module 204 may gather enrichment data from various sources as context to aggregate observed activity patterns as events. For example, an aggregation module 204 may correspond to the aggregation component 110 of FIG. 1 as described above.

According to example embodiments of the present disclosure, the detection module 206 may configure the computing system(s) 200 to receive unprocessed or partially processed monitoring information from the security component 104 over a secured connection. As described above, observed activity patterns may be filtered at the security component 104 by filters of the kernel-level security agents to exclude some activity patterns of the host 102, such as known safe activity patterns, causing size of data transferred over the secured connection to be reduced; the observed activity patterns may alternatively be transferred through the secured connection without filtering.

The detection module 206 may include one or more configurable filters implementing filtering rules configurable by a human operator, configuring the computing system(s) 200 to further exclude activity patterns from the received monitoring information by enforcing the filtering rules. According to example embodiments of the present disclosure, the detection module 206 may also include one or more situational models, such as models of parameters based on individual hosts 102, based on types of computing devices, or based on a generic device.

According to example embodiments of the present disclosure, filters of the detection module 206 may configure the computing system(s) 200 to base filtering rules upon baseline activity patterns described by situational models. Baseline activity patterns may be descriptions of commonplace activity patterns on modeled hosts or devices which do not elicit security interest, such that security interest, and therefore further examination by a human operator, would likely only be warranted upon observation of activity patterns deviating from these baseline activity patterns. For example, in the event that a host A gains remote access of user space memory of a host B to run an executable file, this may be an event of security interest if baseline activity patterns of host A do not include gaining remote access at other hosts or running this same executable file in user space memory of other hosts, but this may not be an event of security interest if baseline activity patterns of host A include routinely gaining remote access at many other hosts and running the same executable file in user space memory thereof (for example, host A may have administrative privileges over other hosts in a networked system).

Thus, the detection module 206 may configure the computing system(s) 200 to enforce filtering rules upon the observed activity patterns received from security component 104, excluding baseline activity patterns and isolating filtered activity patterns of security interest. The detection module 206 may configure the computing system(s) 200 to update these models based on notifications from the mitigation module 210 (as shall be described subsequently) and subsequently reference the updated models in enforcing filtering rules.

According to example embodiments of the present disclosure, filters of the detection module 206 may configure the computing system(s) 200 to base filtering rules upon output of a machine learning model trained on a historical corpus of activity patterns and detected malware attacks/intrusions on hosts 102, monitoring information of which may have been communicated to the computing system(s) 200 and recorded thereon. Such a machine learning model may configure the computing system(s) 200 to input observed activity patterns received from hosts 102 into the machine learning model, and to perform computations by the machine learning model to output filtered activity patterns upon which filtering rules of filters of the detection module 206 may be based.

Machine learning generally involves processing training a machine learning model on one or more sets of labeled samples (called "training data"). A machine learning model, once trained, may learn a set of parameters, such as an embedding of features in some number of dimensions (a "feature embedding") which enable the model to compute unlabeled samples as input and estimate or predict one or more result(s) as output. For example, a trained machine learning model may be a classifier which learns a set of parameters which enable the classifier to classify unlabeled input (e.g., an unknown activity patterns) as one of multiple class labels (e.g., a class label of "compromised" vs. "uncompromised", "high severity level" vs. "low severity level", etc.). Any single machine learning model, or an ensemble of base-level machine learning models, may serve this purpose, including, without limitation, tree-based models, support vector machines ("SVMs"), kernel methods, neural networks, random forests, splines (e.g., multivariate adaptive regression splines), hidden Markov models ("HMMs"), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine learning models whose outputs (predictions) are combined, such as by using weighted averaging or voting. Individual machine learning models of an ensemble can differ in their training processes, and the ensemble can operate as a committee of individual machine learning models that is collectively "smarter" than any individual machine learning model of the ensemble.

According to example embodiments of the present disclosure, the detection module 206 may configure the computing system(s) 200 to classify a severity level of filtered activity patterns depending on the activity pattern type, based on whether that particular activity pattern type is a stronger indication of attack. That is, an activity pattern having explicit threat features which are embedded by the model as nearest to features of clear suspicious activity patterns on a remote system may be classified at a high severity level, while an activity pattern having inferred threat features which are embedded by the model as nearer to features of suspicious activity patterns than features of clear suspicious activity patterns may be classified at a medium severity level. For instance, an activity pattern may have explicit features showing that host A gained remote access to user space memory of host B, and is causing host B to run multiple data gathering commands with lateral movement or is causing host B to download suspicious files and scheduling tasks to run the files. A learned feature embedding of a machine learning model may embed these features nearest to features of clear suspicious activity patterns, causing the activity pattern to be classified at a high severity level.

According to example embodiments of the present disclosure, an analysis module 208 may configure the computing system(s) 200 to determine that hosts 102 are potentially compromised. Determining that a host 102 is potentially compromised may include determining that activity patterns at the host 102 observed by a security component 104 running on the host (possibly after excluding baseline activity patterns, according to example embodiments of the present disclosure) are consistent with malicious code activity patterns, attack activity patterns, and the like. According to example embodiments of the present disclosure, the analysis module 208 may configure the computing system(s) 200 to analyze the observed activity patterns, in conjunction with inter-host activity patterns between the host 102 and other hosts. According to example embodiments of the present disclosure, the analysis module 208 may configure the computing system(s) 200 to analyze the observed activity patterns within a predefined time interval. An analyzed time interval may be selected according to configuration settings, which may be set to a default time interval and may be modified by a human operator, as shall be subsequently described. The analysis module 208 may configure the computing system(s) 200 to store all activity pattern data as historical data that may be further reviewed by a human operator, may be input into a machine learning model as described above, and the like.

According to example embodiments of the present disclosure, the analysis module 208 may correspond to the analysis component 112 of FIG. 1 as described above.

The analysis module 208 may configure the computing system(s) 200 to further aggregate incident scores to improve summarization of analysis of monitoring information. The analysis module 208 may configure the computing system(s) 200 to determine a fidelity value for each host 102 based at least in part on filtered activity patterns from the detection module 206, a time interval of the observed activity pattern as described above, and a classification of severity level as described above. In the event that a fidelity value is above a predetermined fidelity threshold (which shall subsequently be described as a "positive fidelity value"), a notification may be generated by a visualization module 212 as described below, alerting a human operator to further review the determined fidelity value and basis therefor.

According to example embodiments of the present disclosure, a fidelity value of a host may be based on cardinality of the set of activity patterns of security interest associated with the host within a predefined time interval. That is, fidelity value may be a number of activity patterns in the set. Additionally and/or alternatively, fidelity value of a host may be based on a severity level of filtered activity patterns for the host; for example, in the event that even one of the activity patterns is classified at high severity level, the fidelity value may be set to a value higher than the predetermined fidelity threshold.

According to example embodiments of the present disclosure, a severity levels may be assigned a corresponding weight, and a fidelity value may be a tally of the activity patterns modified by the weight. For example, the analysis module 208 may upweigh a first fidelity value of a first host by at least a portion of a second fidelity value of a second host that has gained remote access to the first host and has executed code on the first host.

Additionally, and/or alternatively, hosts having activity patterns exhibiting mutual remote access therebetween of security interest may be grouped together into a group of activity patterns, and a fidelity value may be determined for the group of activity patterns. The group fidelity value may be based on a highest fidelity value for any one host of the group, or may be based on a cardinality of a superset of filtered activity patterns of all hosts of the group.

The mitigation module 210 may configure the computing system(s) 200 to generate one or more notifications alerting a human operator to apply human judgment to identify a possible attack on a host 102 by, for example, alerting the human operator to activity patterns having security interest which have been analyzed as indicating a host 102 being potentially compromised, or which have not been conclusively analyzed as indicating a host being potentially compromised but which nevertheless exhibit security interest. Additionally, to draw attention to high severity level activity patterns or activity pattern groups, the mitigation module 210 may configure the computing system(s) 200 to establish a threat alert priority presentation ranking. The threat alert priority presentation ranking may be based on fidelity values of activity patterns and/or events over a host uptime interval, severity levels pertaining to activity patterns and/or events over a host uptime interval, notification history pertaining to activity patterns and/or events over a host uptime interval, or any combination thereof. For example, activity patterns, events, and/or notifications may be ranked according to respective severity levels during respective host uptime intervals, followed by respective fidelity values during respective host uptime intervals. Based on a presentation ranking, a visualization module 212 as subsequently described may visualize activity patterns and alerts having highest severity level during their respective host uptime intervals in a foremost position in an ordering thereof, sorted by the highest fidelity values first; and then visualize the next severity level in a subsequent position in an ordering thereof, sorted by the highest fidelity values first.

According to example embodiments of the present disclosure, a visualization module 212 may configure the computing system(s) 200 to show user interfaces, views, graphics, visualizations, notifications, and the like on one or more output device(s) 226 viewable by a human operator of the computing system(s) 200. User interfaces, views, graphics, visualizations and the like may present activity patterns and/or events in one or more views. Notifications may alert a human operator to observed activity patterns and/or events pertaining to one or more hosts 102 being analyzed to determine that the one or more hosts 102 may be compromised; may alert a human operator to observed activity patterns and/or events pertaining to one or more hosts 102 not having been conclusively analyzed to determine that the one or more hosts 102 are compromised, but still exhibiting security interest; and the like.

Figure 3:
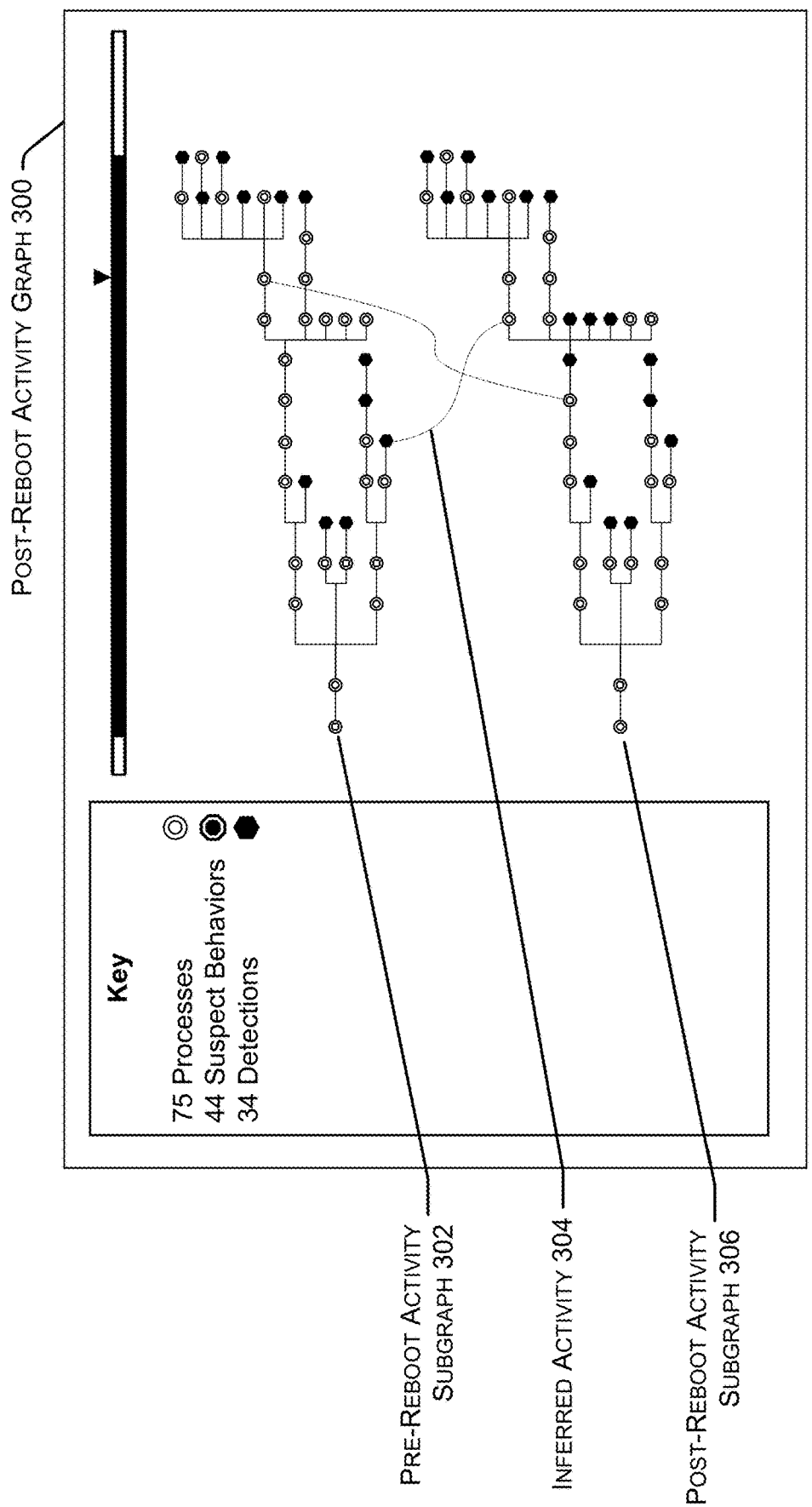
FIG. 3 illustrates an example visualization of detecting malicious activity and connecting subgraphs representing activity on a single host after a reboot, as discussed herein.
Figure 4:
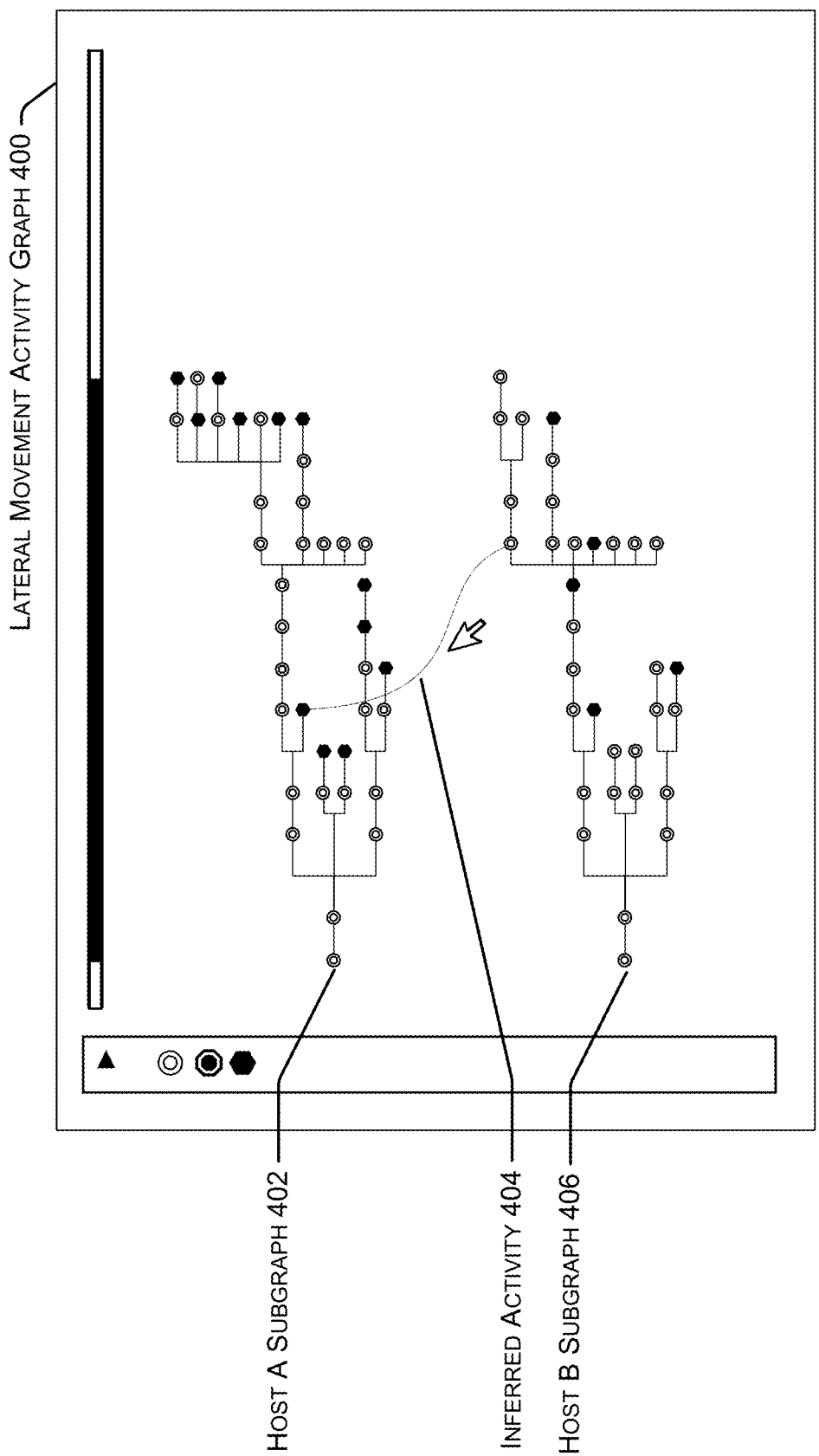
FIG. 4 illustrates an example visualization of detecting movement from a first host with detected malicious activity to second host by connecting subgraphs representing activity on different hosts, as discussed herein.
Figure 5:
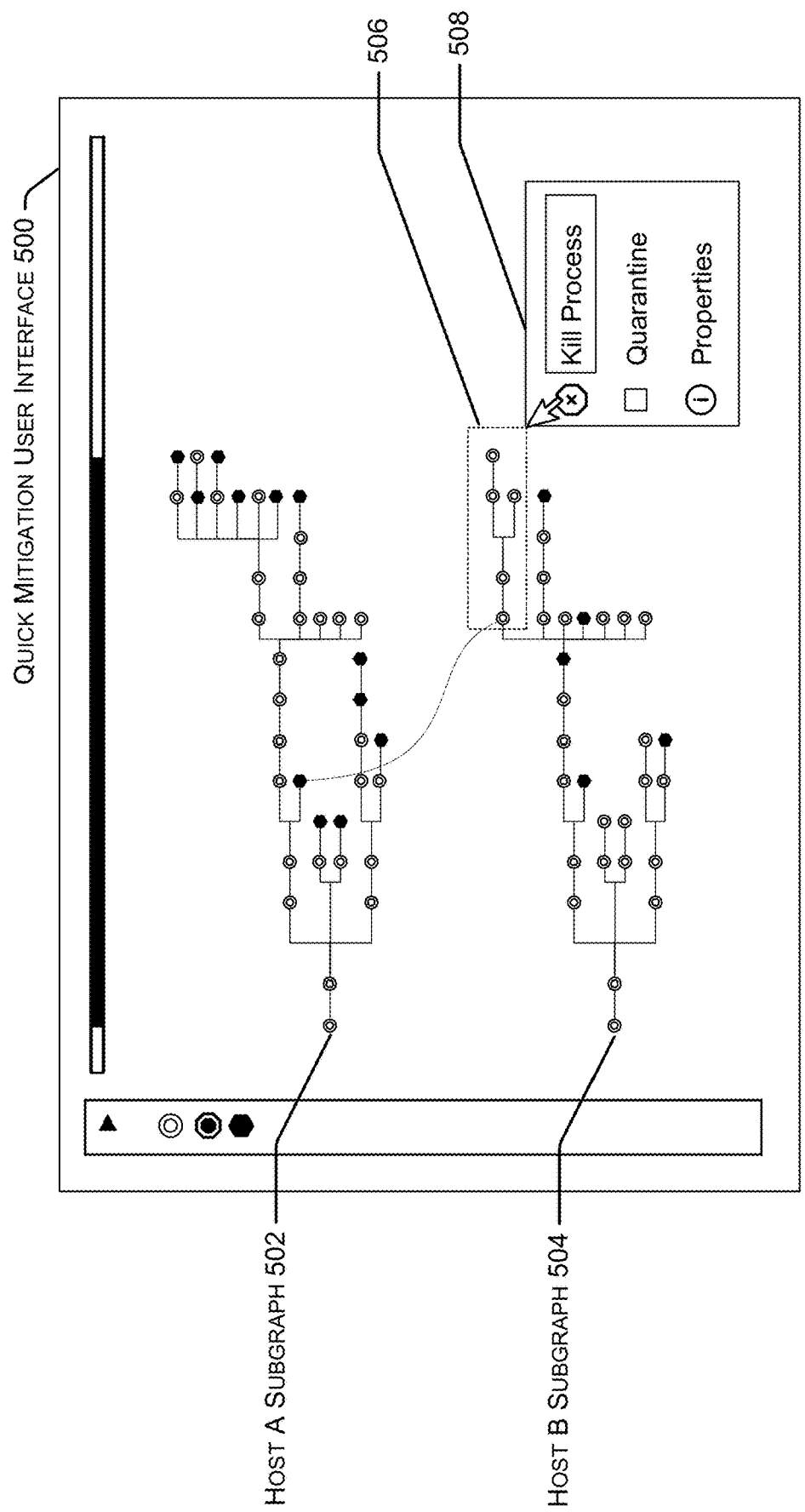
FIG. 5 illustrates an example visualization of activity graphs with quick-action buttons for mitigation of malicious events, as discussed herein.

Based on inspecting user interfaces, views, graphics, visualizations, notifications, and the like on one or more output device(s) 226 of the computing system(s) 200, a human operator may make decisions regarding appropriate actions to be enacted on one or more hosts 102, and may operate the computing system(s) 200 to input information at one or more user interfaces presented by the visualization module 212 to cause the computing system(s) 200 to send commands to one or more hosts 102. Examples of user interfaces, views, graphics, visualizations, and notifications which a visualization module 212 may configure computing system(s) 200 to present are illustrated in FIGS. 3-5, which presents multiple graphical visualizations of hosts 102 and logical interconnections therebetween based on monitoring information collected by security components 104 and received by the computing system(s) 200, as described herein.

According to example embodiments of the present disclosure, the visualization module 212 may, based on activity patterns, events, incident scores, and the like, generate a visual graph displayable by computing system(s) 200 mapping unbounded incident scores to a fixed range. A visual graph may include one or more subgraphs. Each subgraph may relate activity patterns and/or events of a particular host of a networked system 100 in at least a spatial dimension and a time dimension. Each subgraph may have one host mapped thereto, and a same host may be mapped to one or more subgraphs. The visualization module 212 may present multiple subgraphs in time alignment along at least a common time dimension, or may present multiple subgraphs side by side along different time dimensions. Subgraph edges in a spatial dimension may be represented orthogonally to subgraph edges in a time dimension.

The visualization module 212 may separately generate each visual subgraph displayable by computing system(s) 200, each subgraph mapping activity patterns and/or events (each of these referred to subsequently as a "graph node") of individual hosts of a particular host. The visualization module 212 may create edges between graph nodes in a spatial dimension and a time dimension. Edges in a spatial dimension may interconnect activity patterns and/or events which newly arise at a point in time, such as an executable file being newly launched in memory of a host, or a network connection being newly opened from a host to an outbound destination. Edges in a time dimension may interconnect activity patterns and/or events which are ongoing from a previous time to a subsequent time, such as an executable file continuing to run after it has been previously launched, or a network connection continuing to send and/or receive data packets after it has been opened.

Additionally, the visualization module 212 may create inter-subgraph edges between graph nodes of different subgraphs. Inter-subgraph edges may interconnect activity patterns and/or events so as to indicate that an activity pattern and/or event involves more than one host. For example, an inter-subgraph edge between graph nodes mapped to two different hosts may indicate that the two graph nodes represent one host gaining remote access to another host; may indicate that the two graph nodes represent one host sending data packets to another host; and the like. With regard to subgraph edges in a spatial dimension and subgraph edges in a time dimension, inter-subgraph edges may be displayed arbitrarily, neither in a spatial dimension nor in a time dimension.

The visualization module 212 may generate a user interface displayable by computing system(s) 200, the user interface including a view wherein one subgraph is visualized, or multiple views wherein one subgraphs is visualized in each view. In a view wherein a subgraphs is visualized, different dimensions may be oriented orthogonally, so that, for example, a spatial dimension and a time dimension are orthogonal to each other. In cases where multiple subgraphs are visualized, each subgraph may be oriented having common dimensionality, so that, for example, spatial dimension orientation is common amongst each subgraph, and time dimension orientation is common amongst each subgraph.

Moreover, in cases wherein multiple subgraphs are visualized, each dimension of each subgraph may be visualized with common scaling or not with common scaling. For example, along a spatial dimension, each edge may be scaled evenly between adjacent nodes, or may not be scaled evenly between adjacent nodes (as scaling along the spatial dimension may be arbitrary and may have no semantic meaning). However, along a time dimension, edges may be scaled according to a uniform scaling proportional to distance along the orientation of the time dimension (as scaling along the time dimension may be read to represent the passage of time).

Moreover, in cases wherein multiple subgraphs are visualized, different subgraphs may be laid out over separate time dimensions, or may be laid out over a same time dimension. In the case that subgraphs are laid out over separate time dimensions, subgraphs may not overlap each other in the direction of orientation of the time dimension. However, in the case that subgraphs are laid out over a same time dimension, subgraphs may overlap each other in the direction of orientation of the time dimension. Laying out subgraphs over a same time dimension may enable the subgraphs to be aligned by time, such that activity patterns and/or events at different hosts which occurred at a same time or similar times may be aligned, facilitating viewing by human operators of the computing system(s) 200.

Moreover, a user interface may be scrolled along the direction of the orientation of the time dimension, such that views may be panned to different times along the time dimension, including some portions of time intervals which may be scrolled off-screen.

Since the visualization module 212 may not cause all subgraphs having inter-subgraph edges therebetween to be displayed concurrently, inter-subgraph edges may be implicitly generated between different subgraphs, but may not be displayed unless the visualization module 212 generates a view causing the computing system(s) 200 to concurrently display two subgraphs connected by a same inter-subgraph edge. Inter-subgraph edges may connect nodes of different subgraphs in arbitrary fashions without regard as to orientation of the spatial dimension and orientation of the time dimension.

Additionally, based on positive incident scores, positive fidelity values, and the like, the visualization module 212 may configure the computing system(s) 200 to highlight nodes representing activity patterns and/or events in the event that certain activity patterns and/or events correlate to positive incident scores and/or correlate to positive fidelity values. Graph nodes may be highlighted such that they are different in color, appearance, animation, and other visual qualities over non-highlighted graph nodes. Graph nodes may be highlighted over times during which an incident corresponding to the positive incident scores to which the activity patterns and/or events represented by the graph nodes is ongoing. Graph nodes may be highlighted over times during which activity patterns and/or events corresponding to the graph nodes, and corresponding to positive incident scores and/or positive fidelity values, are occurring. In such fashions, activity patterns and/or events which exhibit security interest may be emphasized for viewing by a human operator.

Additionally, the visualization module 212 may configure the computing system(s) 200 to display one or more subgraphs in a progressively animated fashion. For example, one or more subgraphs may be displayed progressively along the orientation of the time dimension, such that graph nodes corresponding to earliest times are displayed first, followed progressively by graph nodes corresponding to progressively later times.

The visualization module 212 may configure the computing system(s) 200 to display one or more notification(s) in a user interface, which may visually alert a human operator to one or more particular hosts 102 identified as potentially compromised during analysis (by, for example, the analysis component 112 and the analysis module 208 as described above). The visualization module 212 may configure the computing system(s) 200 to display the one or more notification(s) based on respective observed activity patterns and/or events from respective security components 104 executing on one or more hosts 102, where the activity patterns and/or events correspond to positive incident scores and/or positive fidelity values, and/or an incident corresponding to positive incident scores to which those activity patterns and/or events correspond is ongoing.

Moreover, the visualization module 212 may configure the computing system(s) 200 to display the one or more notification(s) based on changes in a ranked incident scoring as described above. For example, a change in a ranked incident scoring may be an incident newly being ranked in a predetermined number of incidents having highest incident scores (e.g., top 10 or top 5) occurring within a predetermined time period (e.g., within 24 hours).

It should be understood that the visualization module 212 may configure the computing system(s) 200 to display such graph nodes and information regarding activity patterns and/or events to which they correspond, as well as information regarding incidents corresponding to positive incident scores to which those activity patterns and/or events correspond, so that they may be viewed by a human operator in full detail even without the computing system(s) 200 displaying any notifications.

According to example embodiments of the present disclosure, an interaction module 214 may configure the computing system(s) 200 to enable one or more elements in a user interface as selectable. A human operator may operate one or more input device(s) 224 of the computing system(s) 200 to select any selectable element of a user interface. The visualization module 212 may configure the computing system(s) 200 to, upon a selectable element of a user interface being selected, display more detailed information regarding entities represented by the selected element. For example, upon a selectable notification of a user interface being selected, the computing system(s) 200 may display more detailed information pertaining to one or more particular hosts 102 which have been identified as potentially compromised. For example, upon any part of a subgraph mapped to a particular host 102 being selected, the computing system(s) 200 may display more detailed information pertaining to observed activity patterns and/or events which occurred at the host 102, processes executing on the host 102 relating to those observed activity patterns and/or events, and/or other information about physical and/or virtual hardware and/or software specifications, environments, statistics, and the like pertaining to the potentially compromised host 102.

By way of example and without limitation, the visualization module 212 may configure the computing system(s) 200 to display one or more types of historical data associated with any particular host 102 for viewing and manual analysis by a human operator. The interaction module 214 may configure the computing system(s) 200 to enable any contiguous ranged selection to be made along a time dimension of one or more subgraphs (where one selection may be made along a time dimension of multiple subgraphs in the event that those subgraphs are laid out over a same time dimension). Such a contiguous ranged selection may represent selection of a time interval with regard to respective hosts that the one or more subgraphs are mapped to.

Upon a time interval being selected with regard to respective hosts, the visualization module 212 may configure the computing system(s) 200 to display more details pertaining to observed activity patterns and/or events of those respective hosts throughout the selected time interval. The further details throughout the selected time interval, in aggregate, may constitute historical data of the respective hosts. Furthermore, the visualization module 212 may configure the computing system(s) 200 to display a log of inter-host activity patterns and/or events occurring during the selected time interval. Inter-host activity patterns and/or events may include activity patterns and/or events initiated by one or more potentially compromised hosts; activity patterns and/or events performed upon one or more potentially compromised hosts; activity patterns and/or events initiated by one potentially compromised host and performed upon another potentially compromised host; and/or activity patterns and/or events between any two or more hosts occurring during the selected time interval without regard as to the natures of the hosts.

The visualization module 212 may further configure the computing system(s) 200 to, while a human operator is operating one or more input device(s) 224 to select a time interval, display informational indicators or distinguishing indicators visually within, surrounding, or overlaying the displayed region of a selection being made. Informational indicators may label activity patterns and/or events occurring within a highlighted range to assist a human operator in identifying those activity patterns and/or events. Distinguishing indicators may visually distinguish activity patterns and/or events occurring within a selected range from activity patterns and/or events occurring outside the selected range.

The interaction module 214 may further configure the computing system(s) 200 to enable multiple selectable elements of a user interface to be selected concurrently. For example, the computing system(s) 200 may enable a human operator operating one or more input device(s) 224 to use methods such as click-and-drag, ctrl-clicking, or shift-clicking to select multiple selectable elements of a user interface concurrently.

The interaction module 214 may further configure the computing system(s) 200 to enable each subgraph of multiple displayed subgraphs as selectable to emphasize, to de-emphasize, and/or to hide. Upon a human operator operating one or more input device(s) 224 to select a subgraph to emphasize or de-emphasize, the visualization module 212 may configure the computing system(s) 200 to emphasize or de-emphasize the entirety of a selected subgraph, which may include, for example, adding colors, highlighting, animations, and the like to each node and/or edge of a subgraph that is emphasized, or removing colors, highlighting, animations, and the like to each node and/or edge of a subgraph that is de-emphasized. Upon a human operator operating one or more input device(s) 224 to select a subgraph to hide, the visualization module 212 may configure the computing system(s) 200 to hide the entirety of a selected subgraph, which may include, for example, removing the selected subgraph from all displays of a displayed user interface, resizing other subgraphs in displays of the displayed user interface to fill space left by the removed selected subgraph, and the like.

The interaction module 214 may further configure the computing system(s) 200 to enable a displayed subgraph as selectable to generate a report. Upon a displayed subgraph being selected to generate a report, the visualization module 212 may configure the computing system(s) 200 to display a visual report, which may be populated at least in part with any, some, or all types of information associated with a host 102 mapped to the subgraph as described above, such as information regarding observed activity patterns, events, incidents, incident scores, fidelity values, time intervals that the foregoing elements correspond to, measurements, quantifications, statistics, and such summary information derived from the foregoing elements, and the like. The report may further be populated at least with information regarding a client or customer entity having authorization, access, and the like over the respective host.

According to example embodiments of the present disclosure, a human operator may operate the computing system(s) 200 and operate one or more input device(s) 224 to input further information into the visual report.

According to example embodiments of the present disclosure, a human operator may operate the computing system(s) 200 to send the visual report to a host 102 based on which the visual report was populated, or to send the visual report to a client or customer entity having authorization, access, and the like over the respective host 102. Sending the visual report may cause users of the host 102 to be notified that the human operator, in a role such as that of a network administrator, security analyst, and the like, has viewed visualizations, analyses, reports, and the like based on monitoring information captured by security components 104 running on the host 102 and has affirmed that the host 102 has been identified as potentially compromised.

However, the human operator need not affirm that the host 102 has been identified as potentially compromised, based on viewing the visualizations, analyses, reports, and the like. Instead, the human operator, after viewing one or more subgraphs notifications, reports, and the like generated by the visualization module 212, and by operating the computing system(s) 200 to view more detailed information regarding the host 102 and other hosts, may determine, based on human judgment above some threshold level of confidence, that the host 102 is most likely not compromised by malware. Based thereon, the human operator and may decide to refrain from sending the report regarding the host 102.

According to example embodiments of the present disclosure, the visualization module 212 may be configured to determine to generate a report regarding a host 102 automatically (i.e., without human intervention). The visualization module 212 may, furthermore, send a non-confidential report, notification, and the like regarding the host 102 being potentially compromised to the host 102 or a client or customer entity having authorization, access, and the like over the host 102, without human intervention. For example, in the event that the mitigation module 210, in a manner as described above, has determined that a fidelity value for a host A is extremely high, the visualization module 212 may send a notification to a client or customer entity having authorization, access, and the like over the host A to begin enacting at least some remedial actions upon the host 102. Additionally, the visualization module 212 may send an activity patterns notification that a remote activity pattern has been observed on a host B to a client or customer entity having authorization, access, and the like over the host B. The visualization module 212 may present the notifications to the client or customer entities utilizing any communication channel, such as an e-mail message, a website associated with the security service system, a text message, a push notification, a social network site, an application running on each of hosts 102, and the like.

According to example embodiments of the present disclosure, the visualization module 212 may correspond to the visualization component 114 of FIG. 1.

According to example embodiments of the present disclosure, an enablement module 216 may configure the computing system(s) 200 to communicate, over a network interface 228, with a security component 104 of any host 102, and to evaluate activity patterns of security interest identified by other modules of the computing system(s) 200, such as the detection module 206 or the analysis module 208. For example, the enablement module 216 may configure the computing system(s) 200 to receive observed activity patterns and data related to such activity patterns, such as forensic data associated with observed activity patterns.

Upon the computing system(s) 200 receiving an activity pattern from a security component 104 running on a particular host, and upon other modules of the computing system(s) 200 identifying the activity pattern as having security interest, the enablement module 216 may determine whether activity patterns similar in nature or timing, or involving the same hosts, have been received from security components 104 of other hosts 102.

Additionally, and/or alternatively, the enablement module 216 may configure the computing system(s) 200 to evaluate the activity pattern having security interest based on one or more rules or heuristics. The enablement module 216 may determine that an activity pattern of security interest may be associated with malicious attack based on these determinations and evaluations and may, in response, perform any or all of selecting the activity pattern and providing the activity pattern to hosts 102 (e.g., for containment purposes, and/or diagnostic, repair, or other purposes); sending updates to the hosts 102 (e.g., a new version of the security component 104, new signatures, new firewall policies etc.); instructing the hosts 102 to perform a remediation action to repair the hosts 102; or otherwise counter effects of malicious code execution.

According to example embodiments of the present disclosure, the enablement module 216 may configure the computing system(s) 200 to send a command to a security component 104 running on a host 102. The command may, for example, enact remote reboots or remote shutdowns at the host 102; enact network containment as described above at the one or more hosts 102; terminate running code such as applications or threads at the one or more hosts 102; or cause various other operations suitable to secure those hosts 102 against damaging effects of incidents identified from past or ongoing events. For example, network containment as described above may be enacted by network segmentation or by blocking outbound and/or inbound traffic matching certain activity patterns. For example, if the enablement module 216 determines that there is a malicious process running cross-machine between two hosts, the enablement module 216 may send a command instructing both hosts to block that activity pattern. According to example embodiments of the present disclosure, if the same malicious process is observed on one or more hosts, the enablement module 216 or another module of the computing system(s) 200 may dynamically generate a new policy specifying an action to block the specific activity pattern, such as a firewall policy, ACL rules, a VLAN or subnet configuration, a SDN configuration, and the like as described above, and send the new policy to the security component 104 running on each of the one or more hosts. The new policy may be the same or may be different for each of one or more hosts, based on the hosts' relationships to each other with regard to the malicious process.

According to example embodiments of the present disclosure, the interaction module 214 may configure the computing system(s) 200 to enable each subgraph node of a subgraph of one or more multiple displayed subgraphs as selectable. With regard to a host 102 mapped to a subgraph, selection of any one or more subgraph node(s) of the subgraph, followed by selection of one of several commands directed at the one or more node(s), may cause the computing system(s) 200 to send a command to enact one or more of the above-mentioned commands upon the host 102, such as enact remote reboots or remote shutdowns at the host 102; enact network containment as described above at the one or more hosts 102; terminate running code such as applications or threads at the one or more hosts 102, particularly applications and/or threads which exhibited activity patterns and/or events represented by the selected node(s); or cause various other operations suitable to secure those hosts 102 against damaging effects of incidents identified from past or ongoing events.

In some instances, any or all of the devices and/or modules of the computing system(s) 200 may have features or functionality in addition to those that FIG. 2 illustrates. For example, some or all of the functionality described as residing within any or all of the computing system(s) 200 of the security service system may reside remotely from that/those computing system(s) 200, in some implementations.

The computing system(s) 200 may be configured to communicate over a telecommunications network using any common wireless and/or wired network access technology. Moreover, the computing system(s) 200 may be configured to run any compatible device OS, including but not limited to, Microsoft Windows Mobile, Google Android, Apple iOS, Linux Mobile, as well as any other common mobile device OS.

The computing system(s) 200 also can include input device(s) 224, such as a keypad, a cursor control, a touch-sensitive display, voice input device, etc., and output device(s) 226 such as a display, speakers, printers, etc. These devices are well known in the art and need not be discussed at length here.

As illustrated in FIG. 2, the computing system(s) 200 also includes the network interface 228 that enables the computing system(s) 200 to communicate with other computing devices, such as any or all of the hosts 102.

FIG. 3 illustrates an example visualization of detecting malicious activity and connecting subgraphs representing activity on a single host after a reboot, as discussed herein. The example visualization may be represented as example post-reboot activity graph 300.

According to example embodiments of the present disclosure, the visualization module 212 may configure computing system(s) 200 to display, on one or more output device(s) 226, a user interface to represent various subgraphs including example pre-reboot activity subgraph 302 and example post-reboot activity subgraph 306. Further, the example post-reboot activity graph 300 may represent various activity patterns observed at host A during a first time internal before a reboot and a subsequent time interval after the reboot, as discussed herein.

Herein, modules of the computing system(s) 200 may determine during the first time interval that host A is under attack based on malicious activity within some confidence threshold. The computing system(s) 200 may save an activity subgraph of example pre-reboot activity subgraph 302. Following a reboot, the system may present the saved activity subgraph including the malicious activity of example pre-reboot activity 302 with newly detected activity in the activity subgraph of example post-reboot activity subgraph 306. The computing system(s) 200 may trace activity patterns between before and after reboot and may visually identify the inferred activity 304 related to the malicious activity, generating inter-subgraph edges as described above and illustrated herein.

According to example embodiments of the present disclosure, the example post-reboot activity graph 300 may be generated by computing system(s) 200 as configured by the visualization module 212, as discussed herein. Of course, the example visualizations are not limited to example post-reboot activity graph 300.

FIG. 4 illustrates an example visualization of detecting movement from a first host with detected malicious activity to second host by connecting subgraphs representing activity on different hosts, as discussed herein. In some instances, the example visualization can be represented as an example lateral movement activity graph 400.

According to example embodiments of the present disclosure, the example lateral movement activity graph 400 can represent various activity subgraphs including a host A subgraph 402 and a host B subgraph 406. Furthermore, the example lateral movement activity graph 400 may represent various activity patterns detected at host A during a first time interval and a subsequent lateral movement of activity patterns to host B, as discussed herein.

In the present example, the computing system(s) 200 may determine during the first time interval that host A is under attack based on detected activity patterns, within some confidence threshold. Based on the lateral movement of activity patterns from a compromised host A, the computing system(s) 200 may display the activity graph including the detected activity patterns of the host A subgraph 402 alongside detected activity patterns in the host B subgraph 406. The computing system(s) 200 may trace activity patterns triggered by compromised host A on host B, and may identify the inferred activity 404 as malicious activity, generating inter-subgraph edges as described above and illustrated herein.

According to example embodiments of the present disclosure, the example lateral movement activity graph 400 may be generated by the computing system(s) 200 as configured by the visualization module 212, as discussed herein. Of course, the example visualizations are not limited to example lateral movement activity graph 400. Furthermore, the host A subgraph 402 and the host B subgraph 406 are not limited to activity patterns from host A and host B.

FIG. 5 illustrates an example visualization of activity graphs with quick-action buttons for mitigation of malicious events, as discussed herein. In some instances, the example visualization can be represented as an example quick mitigation user interface 500.

According to example embodiments of the present disclosure, the example quick mitigation user interface 500 may represent various activity graphs including a host A subgraph 502 and a host B subgraph 504. Furthermore, the example quick mitigation user interface 500 may represent various activity patterns detected at host A during a first time interval and a subsequent lateral movement of activity patterns to host B, as discussed herein.

In the present example, the system may determine during the first time interval that host A is under attack based on detected activity patterns, within some confidence threshold. Based on the lateral movement of activity patterns from a compromised host A, the system may display the activity graph including the detected activity of the host A subgraph 502 with detected activity in a host B subgraph 504. The system may trace activity patterns triggered by compromised host A on host B, and may identify the processes as related to malicious activity, generating inter-subgraph edges as described above and illustrated herein.

A human operator may operate the computing system(s) 200 to interact with the example quick mitigation user interface 500 and select the activity patterns triggered by compromised host A as indicated by example multiple selection 506. The example multiple selection 506 may trigger display of example mitigation commands 508. Herein, the human operator may select one of the commands from the example mitigation commands 708 to enact remote reboots or remote shutdowns at host A, enact network containment as described above at host A, terminate running code such as applications or threads at host A, particularly applications and/or threads which exhibited activity patterns and/or events represented by the selected node(s).

According to example embodiments of the present disclosure, the example quick mitigation user interface 500 may be generated by the visualization module 212, as discussed herein. Of course, the example visualizations are not limited to the example quick mitigation user interface 500. Furthermore, the host A subgraph 502 or the host B subgraph 504 are not limited to activity patterns from host A and host B. Furthermore, the example multiple selection 506 is not limited to selection by clicking and dragging a box around activity patterns, but could be aggregated from multiple selections by ctrl-clicking, shift-clicking, and the like as described above. Furthermore, the example mitigation commands 508 are not limited to those shown herein, and may cause various other operations suitable to secure host A against damaging effects of incidents identified from past or ongoing events.

Figure 6:
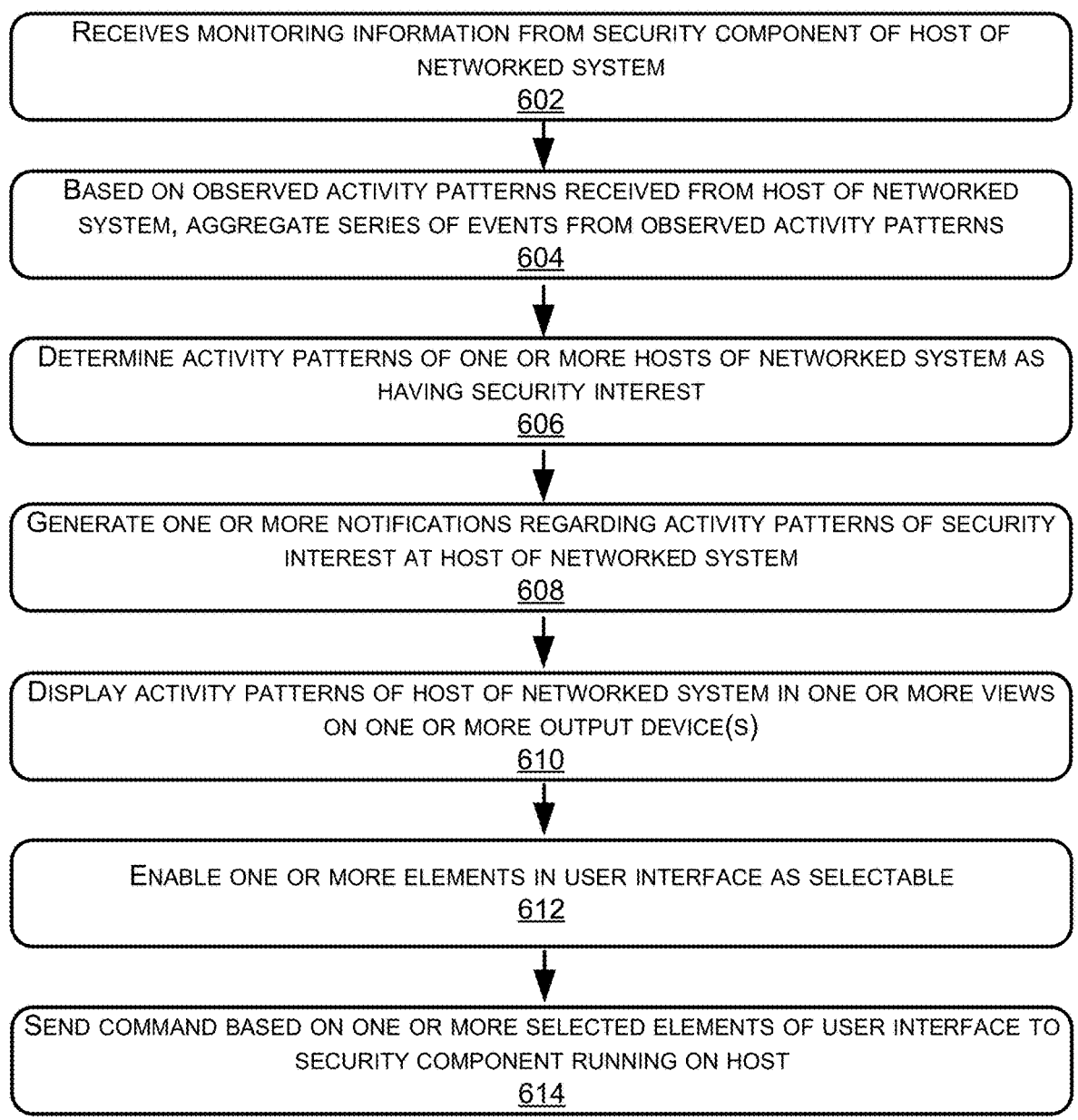
FIG. 6 illustrates a flowchart of a method of visualization and control of remotely monitored server hosts according to example embodiments of the present disclosure.

FIG. 6 illustrates a flowchart of a method of visualization and control of remotely monitored server hosts 600 according to example embodiments of the present disclosure.

In step 602 of the method 600, a computing system receives monitoring information from a security component of a host of a networked system. As described above with reference to the detection module 206, the monitoring information may be received over a secured connection. Observed activity patterns may be filtered at a security component of the host by filters of kernel-level security agents of the security component to exclude some activity patterns of the host, such as known safe activity patterns, causing size of data transferred over the secured connection to be reduced; the observed activity patterns may alternatively be transferred through the secured connection without filtering.

One or more configurable filters implementing filtering rules configurable by a human operator may configure the computing system(s) to further exclude activity patterns from the received monitoring information by enforcing the filtering rules.

Filters of the detection module may configure the computing system(s) to base filtering rules upon baseline activity patterns described by situational models.

The computing system(s) may enforce filtering rules upon the observed activity patterns received from security component, excluding baseline activity patterns and isolating filtered activity patterns of security interest. The computing system(s) may update these models based on notifications from the mitigation module (as shall be described subsequently) and subsequently reference the updated models in enforcing filtering rules.

The computing system(s) may base filtering rules upon output of a machine learning model trained on a historical corpus of activity patterns and detected malware attacks/intrusions on hosts, monitoring information of which may have been communicated to the computing system(s) and recorded thereon. Such a machine learning model may configure the computing system(s) to input observed activity patterns received from hosts into the machine learning model, and to perform computations by the machine learning model to output filtered activity patterns upon which filtering rules of filters of the detection module may be based.

The computing system(s) may classify a severity level of filtered activity patterns depending on the activity pattern type, based on whether that particular activity pattern type is a stronger indication of attack.

In step 604 of the method 600, a computing system, based on observed activity patterns received from a host of a networked system, aggregates a series of events from the observed activity patterns.

As described above with reference to the aggregation component 110 and the aggregation module 204, a plurality of aggregated events over host uptime may summarize the observed activity patterns as a time series of data, each event being a data entry which aggregates activity patterns over a discrete period of host uptime which may follow some number of preceding events and which may precede some number of subsequent events.

In step 606 of the method 600, a computing system determines activity patterns of one or more hosts of the networked system as having security interest. Determining that a host is potentially compromised may include determining that activity patterns at the host observed by a security component running on the host (possibly after excluding baseline activity patterns, according to example embodiments of the present disclosure) are consistent with malicious code activity patterns, attack activity patterns, and the like. According to example embodiments of the present disclosure, the computing system may analyze the observed activity patterns, in conjunction with inter-host activity patterns between the host and other hosts. According to example embodiments of the present disclosure, the computing system may analyze the observed activity patterns within a predefined time interval. The computing system(s) may store all activity pattern data as historical data that may be further reviewed by a human operator, may be input into a machine learning model as described above, and the like.

The computing system(s) may further aggregate incident scores to improve summarization of analysis of monitoring information. The computing system(s) may determine a fidelity value for each host based at least in part on filtered activity patterns from the detection module, a time interval of the observed activity pattern as described above, and a classification of severity level as described above.

According to example embodiments of the present disclosure, a fidelity value of a host may be based on cardinality of the set of activity patterns of security interest associated with the host within a predefined time interval. That is, fidelity value may be a number of activity patterns in the set. Additionally and/or alternatively, fidelity value of a host may be based on a severity level of filtered activity patterns for the host; for example, in the event that even one of the activity patterns is classified at high severity level, the fidelity value may be set to a value higher than the predetermined fidelity threshold.

According to example embodiments of the present disclosure, a severity levels may be assigned a corresponding weight, and a fidelity value may be a tally of the activity patterns modified by the weight. For example, the analysis module may upweigh a first fidelity value of a first host by at least a portion of a second fidelity value of a second host that has gained remote access to the first host and has executed code on the first host.

Additionally, and/or alternatively, hosts having activity patterns exhibiting mutual remote access therebetween of security interest may be grouped together into a group of activity patterns, and a fidelity value may be determined for the group of activity patterns. The group fidelity value may be based on a highest fidelity value for any one host of the group, or may be based on a cardinality of a superset of filtered activity patterns of all hosts of the group.

In step 608 of the method 600, the computing system generates one or more notifications regarding activity patterns of security interest at a host of the networked system. A notification may alert a human operator to apply human judgment to identify a possible attack on a host by, for example, alerting the human operator to activity patterns having security interest which have been analyzed as indicating a host being potentially compromised, or which have not been conclusively analyzed as indicating a host being potentially compromised but which nevertheless exhibit security interest. Additionally, to draw attention to high severity level activity patterns or activity pattern groups, the computing system may establish a threat alert priority presentation ranking. The threat alert priority presentation ranking may be based on fidelity values of activity patterns and/or events over a host uptime interval, severity levels pertaining to activity patterns and/or events over a host uptime interval, notification history pertaining to activity patterns and/or events over a host uptime interval, or any combination thereof. For example, activity patterns, events, and/or notifications may be ranked according to respective severity levels during respective host uptime intervals, followed by respective fidelity values during respective host uptime intervals.

In step 610 of the method 600, a computing system may display activity patterns of a host of the networked system in one or more views on one or more output device(s). The computing system may show user interfaces, views, graphics, visualizations, notifications, and the like on one or more output device(s) viewable by a human operator of the computing system. User interfaces, views, graphics, visualizations and the like may present activity patterns and/or events in one or more views. Notifications may alert a human operator to observed activity patterns and/or events pertaining to one or more hosts being analyzed to determine that the one or more hosts may be compromised; may alert a human operator to observed activity patterns and/or events pertaining to one or more hosts not having been conclusively analyzed to determine that the one or more hosts are compromised, but still exhibiting security interest; and the like.

Based on inspecting user interfaces, views, graphics, visualizations, notifications, and the like on one or more output device(s) of the computing system, a human operator may make decisions regarding appropriate actions to be enacted on one or more hosts, and may operate the computing system to input information at one or more user interfaces to cause the computing system to send commands to one or more hosts.

The computing system may display a visual graph mapping unbounded incident scores to a fixed range. A visual graph may include one or more subgraphs. Each subgraph may relate activity patterns and/or events of a particular host of a networked system in at least a spatial dimension and a time dimension. Each subgraph may have one host mapped thereto, and a same host may be mapped to one or more subgraphs. Multiple subgraphs may be displayed in time alignment along at least a common time dimension, or may present multiple subgraphs side by side along different time dimensions. Subgraph edges in a spatial dimension may be represented orthogonally to subgraph edges in a time dimension.

Each subgraph may map activity patterns and/or events (each of these referred to subsequently as a "graph node") of individual hosts of a particular host. Edges may connect graph nodes in a spatial dimension and a time dimension. Edges in a spatial dimension may interconnect activity patterns and/or events which newly arise at a point in time, such as an executable file being newly launched in memory of a host, or a network connection being newly opened from a host to an outbound destination. Edges in a time dimension may interconnect activity patterns and/or events which are ongoing from a previous time to a subsequent time, such as an executable file continuing to run after it has been previously launched, or a network connection continuing to send and/or receive data packets after it has been opened.

Inter-subgraph edges may connect graph nodes of different subgraphs. Inter-subgraph edges may interconnect activity patterns and/or events so as to indicate that an activity pattern and/or event involves more than one host. For example, an inter-subgraph edge between graph nodes mapped to two different hosts may indicate that the two graph nodes represent one host gaining remote access to another host; may indicate that the two graph nodes represent one host sending data packets to another host; and the like. With regard to subgraph edges in a spatial dimension and subgraph edges in a time dimension, inter-subgraph edges may be displayed arbitrarily, neither in a spatial dimension nor in a time dimension.

The computing system may display a user interface, the user interface including a view wherein one subgraph is, or multiple subgraphs are, visualized. In a view wherein one or more subgraphs are visualized, different dimensions may be oriented orthogonally, so that, for example, a spatial dimension and a time dimension are orthogonal to each other. In a view where multiple subgraphs are visualized, each subgraph may be oriented having common dimensionality, so that, for example, spatial dimension orientation is common amongst each subgraph, and time dimension orientation is common amongst each subgraph.

Moreover, in a view wherein multiple subgraphs are visualized, each dimension of each subgraph may be visualized with common scaling or not with common scaling. For example, along a spatial dimension, each edge may be scaled evenly between adjacent nodes, or may not be scaled evenly between adjacent nodes (as scaling along the spatial dimension may be arbitrary and may have no semantic meaning). However, along a time dimension, edges may be scaled according to a uniform scaling proportional to distance along the orientation of the time dimension (as scaling along the time dimension may be read to represent the passage of time).

Moreover, in a view wherein multiple subgraphs are visualized, different subgraphs may be laid out over separate time dimensions, or may be laid out over a same time dimension. In the case that subgraphs are laid out over separate time dimensions, subgraphs may not overlap each other in the direction of orientation of the time dimension. However, in the case that subgraphs are laid out over a same time dimension, subgraphs may overlap each other in the direction of orientation of the time dimension. Laying out subgraphs over a same time dimension may enable the subgraphs to be aligned by time, such that activity patterns and/or events at different hosts which occurred at a same time or similar times may be aligned, facilitating viewing by human operators of the computing system.

Since not all subgraphs having inter-subgraph edges therebetween to be displayed concurrently, inter-subgraph edges may be implicitly generated between different subgraphs, but may not be displayed unless the computing system concurrently displays two subgraphs connected by a same inter-subgraph edge. Inter-subgraph edges may connect nodes of different subgraphs in arbitrary fashions without regard as to orientation of the spatial dimension and orientation of the time dimension.

Additionally, based on positive incident scores, positive fidelity values, and the like, the computing system may highlight nodes representing activity patterns and/or events in the event that certain activity patterns and/or events correlate to positive incident scores and/or correlate to positive fidelity values. Graph nodes may be highlighted such that they are different in color, appearance, animation, and other visual qualities over non-highlighted graph nodes. Graph nodes may be highlighted over times during which an incident corresponding to the positive incident scores to which the activity patterns and/or events represented by the graph nodes is ongoing. Graph nodes may be highlighted over times during which activity patterns and/or events corresponding to the graph nodes, and corresponding to positive incident scores and/or positive fidelity values, are occurring. In such fashions, activity patterns and/or events which exhibit security interest may be emphasized for viewing by a human operator.

Additionally, the computing system(s) may display one or more subgraphs in a progressively animated fashion. For example, one or more subgraphs may be displayed progressively along the orientation of the time dimension, such that graph nodes corresponding to earliest times are displayed first, followed progressively by graph nodes corresponding to progressively later times.

The computing system may display one or more notification(s) in a user interface, which may visually alert a human operator to one or more particular hosts identified as potentially compromised during analysis (as described above). The computing system may display the one or more notification(s) based on respective observed activity patterns and/or events from respective security components executing on one or more hosts, where the activity patterns and/or events correspond to positive incident scores and/or positive fidelity values, and/or an incident corresponding to positive incident scores to which those activity patterns and/or events correspond is ongoing.

Moreover, the computing system may display the one or more notification(s) based on changes in a ranked incident scoring as described above. For example, a change in a ranked incident scoring may be an incident newly being ranked in a predetermined number of incidents having highest incident scores (e.g., top 10 or top 5) occurring within a predetermined time period (e.g., within 24 hours).

The computing system(s) may display such graph nodes and information regarding activity patterns and/or events to which they correspond, as well as information regarding incidents corresponding to positive incident scores to which those activity patterns and/or events correspond, so that they may be viewed by a human operator in full detail even without the computing system(s) displaying any notifications.

In a step 612 of the method 600, the computing system enables one or more elements in a user interface as selectable. A human operator may operate one or more input device(s) of the computing system to select any selectable element of a user interface. The computing system, upon a selectable element of a user interface being selected, displays more detailed information regarding entities represented by the selected element. For example, upon a selectable notification of a user interface being selected, the computing system may display more detailed information pertaining to one or more particular hosts which have been identified as potentially compromised. For example, upon any part of a subgraph mapped to a particular host being selected, the computing system may display more detailed information pertaining to observed activity patterns and/or events which occurred at the host, processes executing on the host relating to those observed activity patterns and/or events, and/or other information about physical and/or virtual hardware and/or software specifications, environments, statistics, and the like pertaining to the potentially compromised host.

By way of example and without limitation, the computing system may display one or more types of historical data associated with any particular host for viewing and manual analysis by a human operator. The computing system may enable any contiguous ranged selection to be made along a time dimension of one or more subgraphs (where one selection may be made along a time dimension of multiple subgraphs in the event that those subgraphs are laid out over a same time dimension). Such a contiguous ranged selection may represent selection of a time interval with regard to respective hosts that the one or more subgraphs are mapped to.

Upon a time interval being selected with regard to respective hosts, the computing system may display more details pertaining to observed activity patterns and/or events of those respective hosts throughout the selected time interval. The further details throughout the selected time interval, in aggregate, may constitute historical data of the respective hosts. Furthermore, the computing system may display a log of inter-host activity patterns and/or events occurring during the selected time interval. Inter-host activity patterns and/or events may include activity patterns and/or events initiated by one or more potentially compromised hosts; activity patterns and/or events performed upon one or more potentially compromised hosts; activity patterns and/or events initiated by one potentially compromised host and performed upon another potentially compromised host; and/or activity patterns and/or events between any two or more hosts occurring during the selected time interval without regard as to the natures of the hosts.

The computing system may, while a human operator is operating one or more input device(s) to select a time interval, display informational indicators or distinguishing indicators visually within, surrounding, or overlaying the displayed region of a selection being made. Informational indicators may label activity patterns and/or events occurring within a highlighted range to assist a human operator in identifying those activity patterns and/or events. Distinguishing indicators may visually distinguish activity patterns and/or events occurring within a selected range from activity patterns and/or events occurring outside the selected range.

The computing system may further enable multiple selectable elements of a user interface to be selected concurrently. For example, the computing system may enable a human operator operating one or more input device(s) to use methods such as click-and-drag, ctrl-clicking, or shift-clicking to select multiple selectable elements of a user interface concurrently.

The computing system may enable each subgraph of multiple displayed subgraphs as selectable to emphasize, to de-emphasize, and/or to hide. Upon a human operator operating one or more input device(s) to select a subgraph to emphasize or de-emphasize, the computing system may emphasize or de-emphasize the entirety of a selected subgraph, which may include, for example, adding colors, highlighting, animations, and the like to each node and/or edge of a subgraph that is emphasized, or removing colors, highlighting, animations, and the like to each node and/or edge of a subgraph that is de-emphasized. Upon a human operator operating one or more input device(s) to select a subgraph to hide, the computing system may hide the entirety of a selected subgraph, which may include, for example, removing the selected subgraph from all displays of a displayed user interface, resizing other subgraphs in displays of the displayed user interface to fill space left by the removed selected subgraph, and the like.

The computing system may enable a displayed subgraph as selectable to generate a report. Upon a displayed subgraph being selected to generate a report, the computing system may display a visual report, which may be populated at least in part with any, some, or all types of information associated with a host mapped to the subgraph as described above, such as information regarding observed activity patterns, events, incidents, incident scores, fidelity values, time intervals that the foregoing elements correspond to, measurements, quantifications, statistics, and such summary information derived from the foregoing elements, and the like. The report may further be populated at least with information regarding a client or customer entity having authorization, access, and the like over the respective host.

At a step 614 of the method 600, the computing system sends a command based on one or more selected elements of the user interface to a security component running on a host.

The computing system may communicate, over a network interface, with a security component of any host, and to evaluate activity patterns of security interest identified by the computing system. For example, the computing system may receive observed activity patterns and data related to such activity patterns, such as forensic data associated with observed activity patterns.

Upon the computing system receiving an activity pattern from a security component running on a particular host, and upon the computing system identifying the activity pattern as having security interest, the computing system may determine whether activity patterns similar in nature or timing, or involving the same hosts, have been received from security components of other hosts.

Additionally, and/or alternatively, the computing system may evaluate the activity pattern having security interest based on one or more rules or heuristics. The computing system may determine that an activity pattern of security interest may be associated with malicious attack based on these determinations and evaluations and may, in response, perform any or all of selecting the activity pattern and providing the activity pattern to hosts (e.g., for containment purposes, and/or diagnostic, repair, or other purposes); sending updates to the hosts (e.g., a new version of the security component, new signatures, new firewall policies etc.); instructing the hosts to perform a remediation action to repair the hosts; or otherwise counter effects of malicious code execution.

According to example embodiments of the present disclosure, the computing system may send a command to a security component running on a host. The command may, for example, enact remote reboots or remote shutdowns at the host; enact network containment as described above at the one or more hosts; terminate running code such as applications or threads at the one or more hosts; or cause various other operations suitable to secure those hosts against damaging effects of incidents identified from past or ongoing events. For example, network containment as described above may be enacted by network segmentation or by blocking outbound and/or inbound traffic matching certain activity patterns. For example, if the computing system determines that there is a malicious process running cross-machine between two hosts, the computing system may send a command instructing both hosts to block that activity pattern. According to example embodiments of the present disclosure, if the same malicious process is observed on one or more hosts, the computing system may dynamically generate a new policy specifying an action to block the specific activity pattern, such as a firewall policy, ACL rules, a VLAN or subnet configuration, a SDN configuration, and the like as described above, and send the new policy to the security component running on each of the one or more hosts. The new policy may be the same or may be different for each of one or more hosts, based on the hosts' relationships to each other with regard to the malicious process.

According to example embodiments of the present disclosure, the computing system(s) may enable each subgraph node of a subgraph of one or more multiple displayed subgraphs as selectable. With regard to a host mapped to a subgraph, selection of any one or more subgraph node(s) of the subgraph, followed by selection of one of several commands directed at the one or more node(s), may cause the computing system(s) to send a command to enact one or more of the above-mentioned commands upon the host, such as enact remote reboots or remote shutdowns at the host; enact network containment as described above at the one or more hosts; terminate running code such as applications or threads at the one or more hosts, particularly applications and/or threads which exhibited activity patterns and/or events represented by the selected node(s); or cause various other operations suitable to secure those hosts against damaging effects of incidents identified from past or ongoing events.

This disclosure describes, in part, techniques and systems for malicious incident detection by scoring, aggregating, and presenting visualization of data associated with events detected on a monitored server host. An incident may be detected from the events detected within a time interval. The incident may indicate that the monitored host may or may not have been "compromised" by malicious behavior (e.g., adversarial activity, malware, etc.) based on the information gathered from the detected events. Initially, the system may gather data for events performed by programs on a monitored host. The data may be analyzed to detect patterns in the events. The patterns may be scored based on the importance of information conveyed by the presence of the patterns based on a frequency of appearance. In various examples, patterns that appear frequently may correlate with less useful information (e.g., information that is relatively less likely to permit detecting a malicious incident); conversely, patterns that appear infrequently may correlate with more useful information (e.g., information that is relatively more likely to permit detecting a malicious incident). For instance, a first pattern appearing with a relatively high frequency may receive a lower pattern score than a second pattern appearing infrequently. The pattern scores may be adjusted by weights based additional information detected by the system. For instance, if the system detects a similar pattern on multiple devices at a similar time frame, the weight of the pattern score for that pattern may increase. The pattern scores may be aggregated by a predetermined time interval into an incident score. The incident score may be compared to threshold score to determine if an incident indicating malicious behavior is occurring. An incident is started when the incident score first exceeds the threshold score and ends when the incident score falls below the threshold score. The incident may be classified (e.g., based on event types) and tagged with additional information found in the data from the detected events and patterns. The incidents may be ranked by their incident scores to surface incidents with higher incident scores, which may indicate more signs of the device being "compromised" by malicious-behavior.

In various examples, once the system has determined that a particular host is compromised within a confidence threshold, the system may store activity graphs for the host and provide additional remedial steps. The system may generate graphs that maps unbounded scores to a fixed range for a human operator to review. The system may further aggregate scores to provide better overview of the situation by analyzing a small number of top scores to produce a confidence estimate of whether there is a multi-prong threat. This confidence estimate is a risk assessment that new high scoring incidents can be expected in the near future. In some examples, the system may remotely store activity graphs of the potentially compromised host as subgraphs and may connect subgraphs to activity on a different device or before/after a reboot of the potentially compromised host. By connecting to the subgraphs to updated activity graphs, the system may detect movement of attacker activity.

In additional examples, the system may present scores and activity graphs on a user interface for a human operator to review. The user interface may include animated activity graphs to show the progress of a past malicious event. The user interface may emphasize, de-emphasize, and/or hide subgraphs. The user interface may include quick-action buttons and wizards to permit users to immediately kill processes or isolate a computer from the network. The user interface may include controls to bulk-tag detected events associated with a subgraph. The user interface may present notifications/dashboards of significant malicious events in progress and update same when a new event rises in incident score into the top 10.

A host may install, and subsequently execute a security agent as part of a security service system to monitor and record events and pattern on a plurality of computing devices in an effort to detect, prevent, and mitigate damage from malware or malicious attack. Upon installation on a host, the security agent may detect, record, and analyze events on the computing device, and the security agent can send those recorded events (or data associated with the events) to a security system implemented in the "cloud" (the "security system" also being referred to herein as a "security service system," a "remote security service," or a "security service cloud"). At the security system, the received events data can be further analyzed for purposes of detecting, preventing, and/or defeating malware and attacks. The security agent resides on the host, observes and analyzes events that occur on the host, and interacts with a security system to enable a detection loop that is aimed at defeating all aspects of a possible attack.

In various examples, the security service system may also monitor similar detected activity pattern occurring at a similar time interval on multiple hosts on a network. The multiple hosts may belong to the same entity or different entities. Although the multiple hosts, taken individually, may exhibit no obvious signs of an attack and the pattern may have a low pattern score, the security service system may increase the weight of this pattern thus increasing the pattern score base on detecting this similar pattern at a similar time on multiple computing devices. In additional examples, if a first pattern and a second pattern exhibit a secondary pattern of appearing together frequently, the first and second patterns may be grouped together as a nested pattern and scored as a nested pattern together. All the security information related to the events, patterns, and the incidents from the devices may be gathered and presented to a human operator. The incidents may be scored, classified, and ranked to facilitate surfacing incidents having important information to convey, so the human operator can better analyze the detected incidents to determine if a device is under attack and to determine the type of attack based on the information.

Some examples herein relate to detecting malware or malicious behavior, e.g., by recording events performed by programs and analyzing distributions of types of those events. For brevity and ease of understanding, as used herein, "security interest" refers to events or behavior determined using techniques described herein as being possibly indicative of attacks or malicious activity. The term "security interest" does not imply or require that any moral, ethical, or legal judgment be brought to bear in determining suspicious events.

As used herein, the term "adversaries" includes, e.g., malware developers, exploit developers, builders and operators of an attack infrastructure, those conducting target reconnaissance, those executing the operation, those performing data exfiltration, and/or those maintaining persistence in the network, etc. Thus the "adversaries" can include numerous people that are all part of an "adversary" group.

Some examples relate to receiving or processing event stream(s) or sequence(s) indicating activities of system components such as processes or threads. Many system components, including malicious system components, perform a particular group of operations repeatedly. For example, a file-copy program repeatedly reads data from a source and writes data to a destination. In another example, a ransomware program repeatedly encrypts a file and deletes the un-encrypted original. Some examples relate to detecting such repetitions. Some examples locate repeated groups of operations based on detected events, permitting malware detection without requiring disassembly or other inspection of the code for that malware.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   determining activity patterns of one or more hosts of a networked system as having security interest;
   displaying the activity patterns of the one or more hosts of the networked system in one or more views of a user interface on one or more output device(s), a view comprising a subgraph of nodes representing activity patterns of a host of the one or more hosts displayed along at least a spatial dimension and a time dimension, and the subgraph comprising an edge in the spatial dimension interconnecting nodes arising at a point in time at the host of the one or more hosts;
   enabling one or more elements in the user interface as selectable; and
   sending a command based on one or more selected elements of the user interface to respective security components running on the one or more hosts.

2. The method of claim 1, wherein a subgraph is selectable to cause the subgraph to be emphasized, de-emphasized, and/or hidden.

3. The method of claim 1, wherein a selected element of the user interface displays a plurality of commands each selectable to cause sending of a command to a security component running on a host of the one or more hosts.

4. The method of claim 1, wherein a plurality of selectable elements of the user interface are selectable concurrently.

5. The method of claim 1, further comprising displaying one or more notification(s) in the user interface based on activity patterns of hosts of the one or more hosts having security interest.

6. A system comprising:
   one or more processors; and
   memory communicatively coupled to the one or more processors, the memory storing computer-executable modules executable by the one or more processors that, when executed by the one or more processors, perform associated operations, the computer-executable modules comprising:
   a detection module configured to determine activity patterns of one or more hosts of a networked system as having security interest;
   a visualization module configured to display the activity patterns of the one or more hosts of the networked system in one or more views of a user interface on one or more output device(s), a view comprising a subgraph of nodes representing activity patterns of a host of the one or more hosts displayed along at least a spatial dimension and a time dimension, and the subgraph comprising an edge in the spatial dimension interconnecting nodes arising at a point in time at the host of the one or more hosts;
   an interaction module configured to enable one or more elements in the user interface as selectable; and
   an enablement module configured to send a command based on one or more selected elements of the user interface to respective security components running on the one or more hosts.

7. The system of claim 6, wherein the interaction module is configured to enable a subgraph as selectable to cause the subgraph to be emphasized, de-emphasized, and/or hidden.

8. The system of claim 6, wherein the visualization module is configured to cause a selected element of the user interface to display a plurality of commands, and the interaction module is configured to enable each command of the plurality of commands as selectable to cause sending of a command to a security component running on a host of the one or more hosts.

9. The method of claim 6, wherein the interaction module is configured to enable a plurality of selectable elements of the user interface as selectable concurrently.

10. The system of claim 6, wherein the visualization module is further configured to display one or more notification(s) in the user interface based on activity patterns of hosts of the one or more hosts having security interest.

11. A computer-readable storage medium storing computer-readable instructions executable by one or more processors, that when executed by the one or more processors, cause the one or more processors to perform operations comprising:
   determining activity patterns of one or more hosts of a networked system as having security interest;
   displaying the activity patterns of the one or more hosts of the networked system in one or more views of a user interface on one or more output device(s), a view comprising a subgraph of nodes representing activity patterns of a host of the one or more hosts displayed along at least a spatial dimension and a time dimension, and the subgraph comprising an edge in the spatial dimension interconnecting nodes arising at a point in time at the host of the one or more hosts;
   enabling one or more elements in the user interface as selectable; and
   sending a command based on one or more selected elements of the user interface to respective security components running on the one or more hosts.

12. The computer-readable storage medium of claim 11, wherein a selected element of the user interface displays a plurality of commands each selectable to cause sending of a command to a security component running on a host of the one or more hosts.

13. The computer-readable storage medium of claim 11, wherein a plurality of selectable elements of the user interface are selectable concurrently.

14. The computer-readable storage medium of claim 11, further comprising displaying one or more notification(s) in the user interface based on activity patterns of hosts of the one or more hosts having security interest.

* * * * *